US 10,403,888 B2

(12) United States Patent
Lin et al.

(10) Patent No.: US 10,403,888 B2
(45) Date of Patent: Sep. 3, 2019

(54) NEGATIVE ELECTRODE MATERIAL OF LITHIUM BATTERY AND METHOD FOR MANUFACTURING THE SAME

(71) Applicant: AUO Crystal Corporation, Taichung (TW)

(72) Inventors: Han-Tu Lin, Hsinchu County (TW); An-Li He, Changhua County (TW); Ying-Ying Su, Kaohsiung (TW); Chan-Tien Chen, Hsinchu County (TW); Rong-Ruey Jeng, Taoyuan (TW); Kun-Fung Lin, Taipei (TW)

(73) Assignee: AUO Crystal Corporation, Taichung (TW)

( * ) Notice: Subject to any disclaimer, the term of this patent is extended or adjusted under 35 U.S.C. 154(b) by 335 days.

(21) Appl. No.: 15/394,825

(22) Filed: Dec. 30, 2016

(65) Prior Publication Data

US 2017/0194641 A1    Jul. 6, 2017

(30) Foreign Application Priority Data

Dec. 30, 2015  (TW) ............................. 104144501 A
Dec. 7, 2016  (TW) ............................. 105140487 A

(51) Int. Cl.
*H01M 4/36* (2006.01)
*H01M 4/38* (2006.01)
(Continued)

(52) U.S. Cl.
CPC ......... *H01M 4/366* (2013.01); *H01M 4/0471* (2013.01); *H01M 4/139* (2013.01);
(Continued)

(58) Field of Classification Search
CPC ........... H01M 10/0525; H01M 4/0471; H01M 4/139; H01M 4/364; H01M 4/366; H01M 4/386; H01M 4/483; H01M 4/58; H01M 4/587
See application file for complete search history.

(56) References Cited

U.S. PATENT DOCUMENTS

2008/0233478 A1* 9/2008 Hirose .................. C25D 15/02
429/220
2008/0248189 A1* 10/2008 Ohtsuka .............. H01M 4/0423
427/58
(Continued)

FOREIGN PATENT DOCUMENTS

CN        1599099 A    3/2005
JP    2006019127 A    1/2006
(Continued)

*Primary Examiner* — Carlos Barcena
(74) *Attorney, Agent, or Firm* — CKC & Partners Co., LLC

(57) ABSTRACT

A method for manufacturing a negative electrode material of a lithium battery is provided. The method includes: covering a metal material and a carbon material on a surface of a silicon material; performing a thermal process for reacting the metal material with the carbon material on the surface of the silicon material thereby forming a silicon composite material and at least one projection on the surface of the silicon material, wherein a free end of the projection is extended to form a head, the silicon composite material is used as the negative electrode material of the lithium battery, the silicon composite material comprises a composite layer forming on the surface of the silicon material, and the composite layer comprises a metal silicide, a metal oxide, a silicon carbide and a silicon oxide.

18 Claims, 25 Drawing Sheets

(51) Int. Cl.
*H01M 4/48* (2010.01)
*H01M 4/583* (2010.01)
*H01M 10/0525* (2010.01)
*H01M 4/04* (2006.01)
*H01M 4/139* (2010.01)
*H01M 4/58* (2010.01)
*H01M 4/587* (2010.01)

(52) U.S. Cl.
CPC ........... *H01M 4/364* (2013.01); *H01M 4/386* (2013.01); *H01M 4/483* (2013.01); *H01M 4/58* (2013.01); *H01M 4/587* (2013.01); *H01M 10/0525* (2013.01)

(56) References Cited

U.S. PATENT DOCUMENTS

| | | | |
|---|---|---|---|
| 2009/0098458 A1* | 4/2009 | Fujii | H01M 4/02 429/209 |
| 2010/0112442 A1* | 5/2010 | Fujikawa | H01G 9/016 429/218.1 |
| 2012/0171566 A1* | 7/2012 | Yoshitake | B82Y 30/00 429/209 |
| 2012/0301783 A1* | 11/2012 | Shimada | H01M 4/134 429/211 |
| 2013/0011736 A1* | 1/2013 | Loveness | H01M 4/0492 429/212 |
| 2014/0162129 A1 | 6/2014 | Kim et al. | |

FOREIGN PATENT DOCUMENTS

| | | |
|---|---|---|
| JP | 2008004562 A | 1/2008 |
| JP | 2015072849 A | 4/2015 |
| KR | 100842930 B1 | 7/2008 |
| KR | 1020150129867 A | 11/2015 |
| TW | 201203668 A | 1/2012 |
| TW | I404257 B | 8/2013 |
| TW | 201341304 A | 10/2013 |
| TW | I487177 B | 6/2015 |
| WO | 2015029100 A1 | 3/2015 |

* cited by examiner

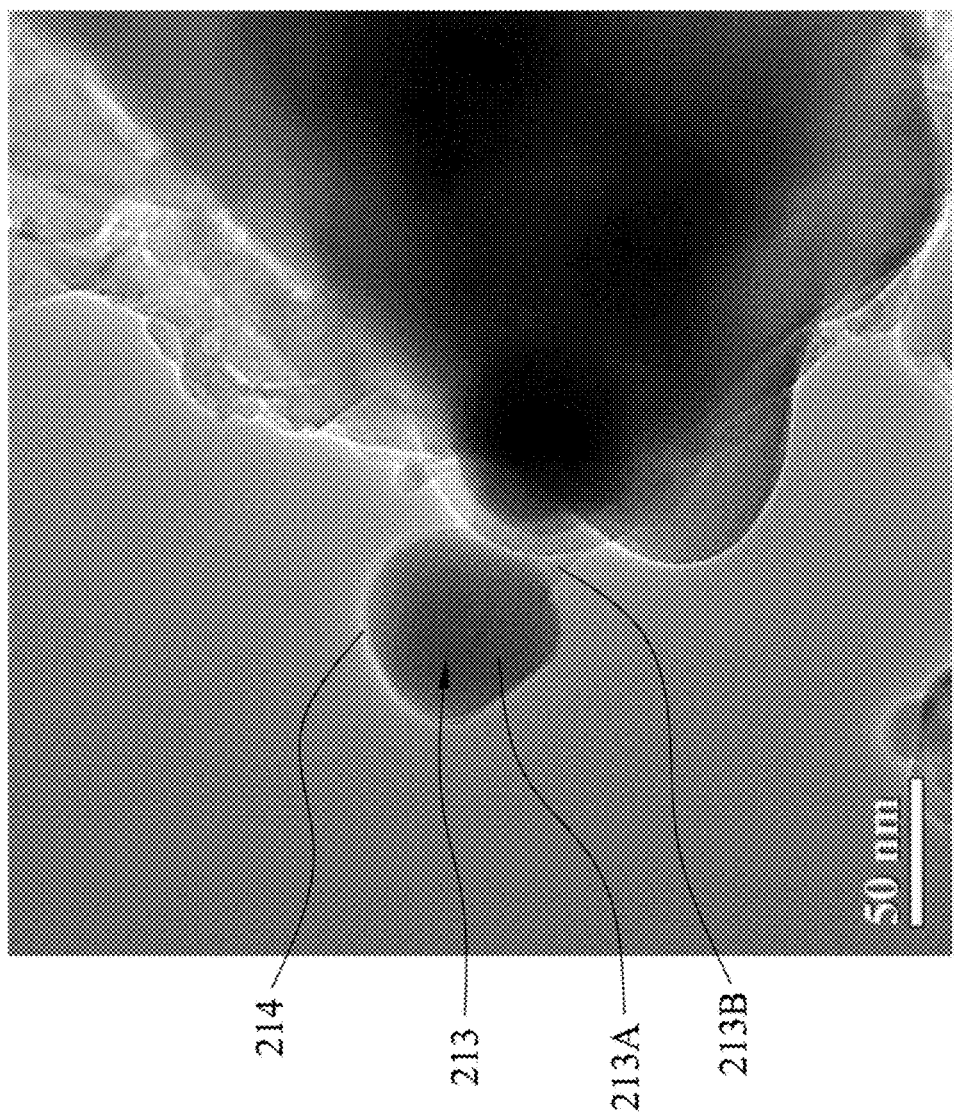

NEGATIVE ELECTRODE MATERIAL OF LITHIUM BATTERY AND METHOD FOR MANUFACTURING THE SAME

RELATED APPLICATIONS

This application claims priority to Taiwan Application Serial Number 104144501, filed Dec. 30, 2015 and Taiwan Application Serial Number 105140487, filed Dec. 7, 2016, all of which are all herein incorporated by reference.

BACKGROUND

Technical Field

The present disclosure relates to a negative electrode material of a lithium battery and a method for manufacturing the same. More particularly, the present disclosure relates to a negative electrode material of a lithium battery that contains silicon carbide and multi-layer graphene and a method for manufacturing the same.

Description of Related Art

Secondary batteries are widely used in recent days. Secondary batteries have advantages of rechargeability, light weight and high operation voltage, thereby solving the problems of relatively low operation life and low capacity, and bring convenience to the use of electronic devices as well as give consideration to both environment and economy.

The operation principle of secondary batteries is based on the oxidation-reduction reaction in the field of electrochemistry. The basic structure of an electrochemistry battery includes a positive electrode, a negative electrode, an isolation film located between the positive electrode and the negative electrode, and an electrolyte used for the reaction. FIG. 1 shows a basic structure of a conventional lithium battery 100 in which a cylinder shaped lithium battery 100 is demonstrated. The lithium battery 100 includes a positive electrode 101, a negative electrode 102 and an isolation film 103. The electrolyte is filled between the positive electrode 101 and the negative electrode 102. The isolation film 103 is used to avoid short circuit caused by contact of the positive electrode 101 with the negative electrode 102.

When the lithium battery 100 is in a discharge state, a reduction reaction involving the gain of electrons is occurred on the positive electrode 101 while an oxidation reaction involving the loss of electrons is occurred on the negative electrode 102. Opposite reactions are occurred when the lithium battery 100 is in a charge state.

So-called lithium battery is referred to as an electrochemistry battery using lithium metal as a negative electrode active material. The lithium battery has advantages of high activity, high electromotive force and light weight. However, the manufacturing cost of the lithium battery using lithium metal as a negative electrode active material is still too high. Moreover, during charge-discharge cycles, the lithium ion will be deposited and dissolved repeatedly on the surface of the lithium metal and a dendritic structure is then formed. When the dendritic structure is gradually accumulated, the isolation film will be pierced through, and the dendritic structure will contact with the positive electrode thereby forming a short circuit. Moreover, large amount of reaction heat will be released, thus the lithium battery will fail or explode.

To solve the problems of low effectiveness, insecurity usage and high cost when using the lithium metal as the negative electrode active material of the lithium battery, non-metal compound such as carbon or carbon composite has been proposed to replace the lithium metal. However, the lithium battery made from such non-metal compound still has disadvantages of low effectiveness and low lifetime. Furthermore, the manufacturing method for such kind of lithium battery is still too complicated and not cost-effective.

Therefore, there is a need to develop a new kind of negative electrode material of the lithium battery and its manufacturing method to increase the effectiveness and the usage life time.

SUMMARY

According to one aspect of the present disclosure, a method for manufacturing a negative electrode material of a lithium battery is provided. The method includes: covering a metal material and a carbon material on a surface of a silicon material; performing a thermal process to make the metal material and the carbon material react on the surface of the silicon material thereby forming a silicon composite material and at least one projection on the surface of the silicon material, wherein a free end of the projection is enlarged to form a head, the silicon composite material is used as the negative electrode material of the lithium battery, the silicon composite material comprises a composite layer forming on the surface of the silicon material, and the composite layer comprises a metal silicide, a metal oxide, a silicon carbide and a silicon oxide.

According to another aspect of the present disclosure, a negative electrode material of a lithium battery is provided. The negative electrode material of the lithium battery includes a silicon composite material and a plurality of graphene units. The silicon composite material includes a silicon material, a composite layer and at least one projection formed on a surface of the silicon material, wherein the composite layer includes a metal silicide, a metal oxide, a silicon carbide and a silicon oxide, and a free end of the projection is enlarged to form a head. The plurality of graphene units are mixed with the silicon composite material to form the negative electrode material of the lithium battery.

According to another aspect of the present disclosure, a negative electrode material of a lithium battery is provided. The negative electrode material of the lithium battery includes a silicon material, wherein at least one projection is formed on a surface of the silicon material, and a free end of the projection is enlarged to form a head.

BRIEF DESCRIPTION OF THE DRAWINGS

The present disclosure can be more fully understood by reading the following detailed description of the embodiment, with reference made to the accompanying drawings as follows:

FIGS. 5A to 5G are Transmission Electron Microscopy (TEM) diagrams and component analysis diagrams showing composite materials after performing a thermal process;

DETAILED DESCRIPTION

It is a purpose of the present disclosure to provide a negative electrode material of a lithium battery. The negative electrode material includes a composite containing a silicon carbide, thus it is capable of increasing the capacity and the charge-discharge efficiency of the lithium battery. Furthermore, a composite layer including a metal silicide and a metal oxide are formed on a surface of a silicon material, thereby reducing the volume expansion of the silicon material which lowering the effectiveness of the lithium battery. A method capable of reducing the manufacturing cost for the lithium battery is also provided.

Figure 1:
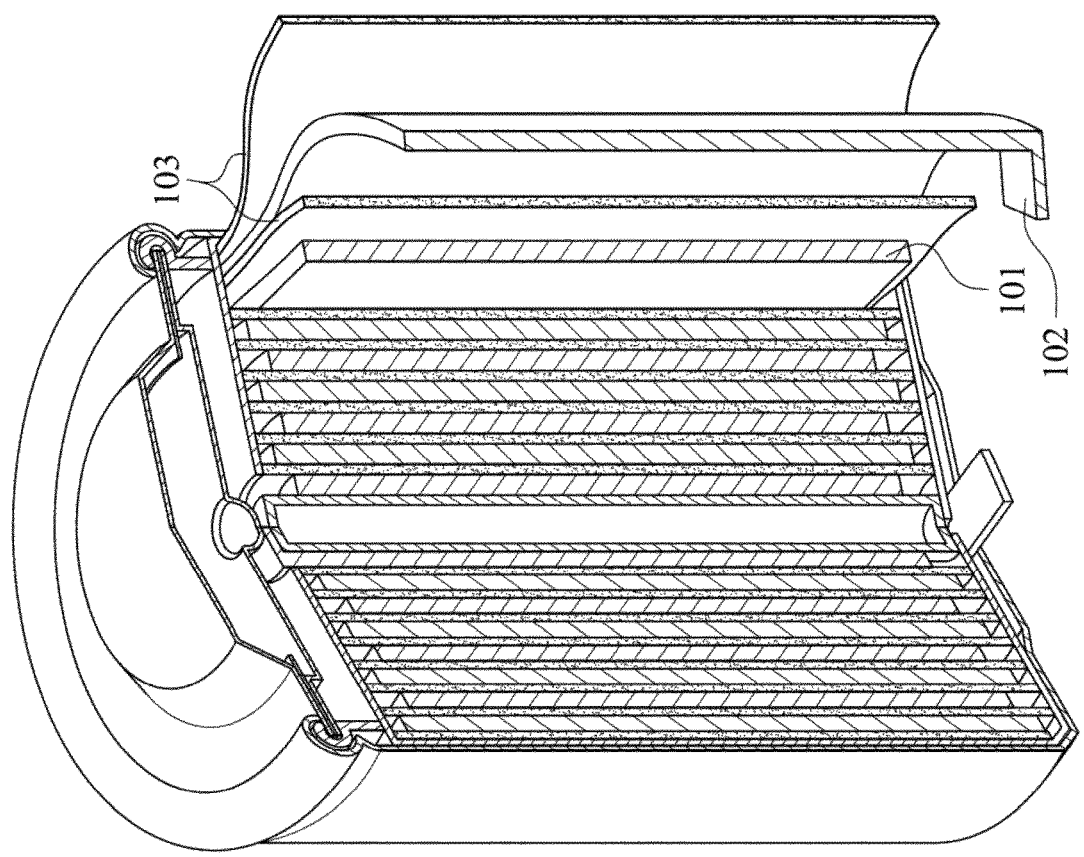
FIG. 1 shows a basic structure of a conventional lithium battery.
Figure 2:
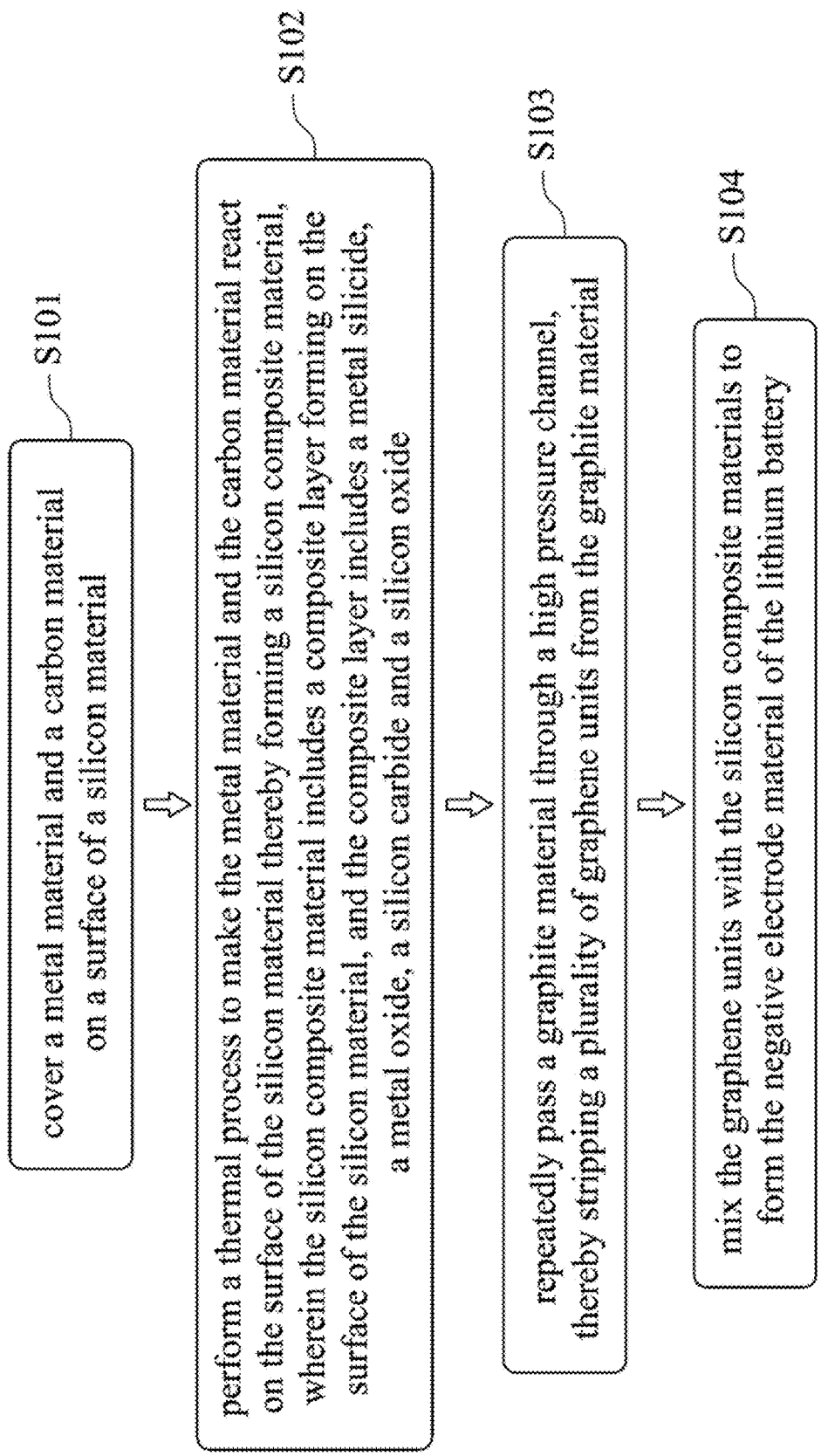
FIG. 2 is a flow chart showing a method for manufacturing a negative electrode material of a lithium battery according to one embodiment of the present disclosure.

FIG. 2 is a flow chart showing a method for manufacturing a negative electrode material of a lithium battery according to one embodiment of the present disclosure. The method includes the following steps.

Step S101 for covering a metal material and a carbon material on a surface of a silicon material.

Step S102 for performing a thermal process to make the metal material and the carbon material react on the surface of the silicon material thereby forming a silicon composite material, wherein the silicon composite material includes a composite layer forming on the surface of the silicon material, and the composite layer includes a metal silicide, a metal oxide, a silicon carbide and a silicon oxide.

Step S103 for repeatedly passing a graphite material through a high pressure channel, thereby stripping a plurality of graphene units from the graphite material.

Step S104 for mixing the graphene units with the silicon composite materials to form the negative electrode material of the lithium battery.

In Step S102, the thermal process is performed at a temperature range within 800° C. and 1200° C. When the thermal process is performed, the metal material and the carbon material are reacted on the surface of the silicon material, and then the composite layer is formed. In another embodiment, the thermal process can be postponed and performed at the Step S104, in other words, the silicon composite material in the Step S104 is formed after mixing the silicon material (covered with the metal material and the carbon material) with the graphene units and then performing the thermal process. In a preferred embodiment, the metal material is nickel (Ni), however, in another embodiment, the metal material can be copper (Cu), titanium (Ti), iron (Fe) and those having a catalytic effect.

The silicon material may be preferably particle shaped (Si particle) but also may be sheet shaped. After the thermal process, a composite layer containing nickel silicide, nickel oxide, silicon carbide and silicon oxide is formed on the surface of the Si particle.

In Step S103, each of the graphene units includes multi-layer graphene. Preferably, the multi-layer graphene includes less than 30 graphene layers. This is due to the fact that the charge-discharge efficiency of the lithium battery increases with the decrease of the number of the layers of the multi-layer graphene. The number of the layers can be controlled by the number of passing through the high pressure channel. A couple to a dozen of layers can be obtained by only one pass through the high pressure channel.

Figure 3A:
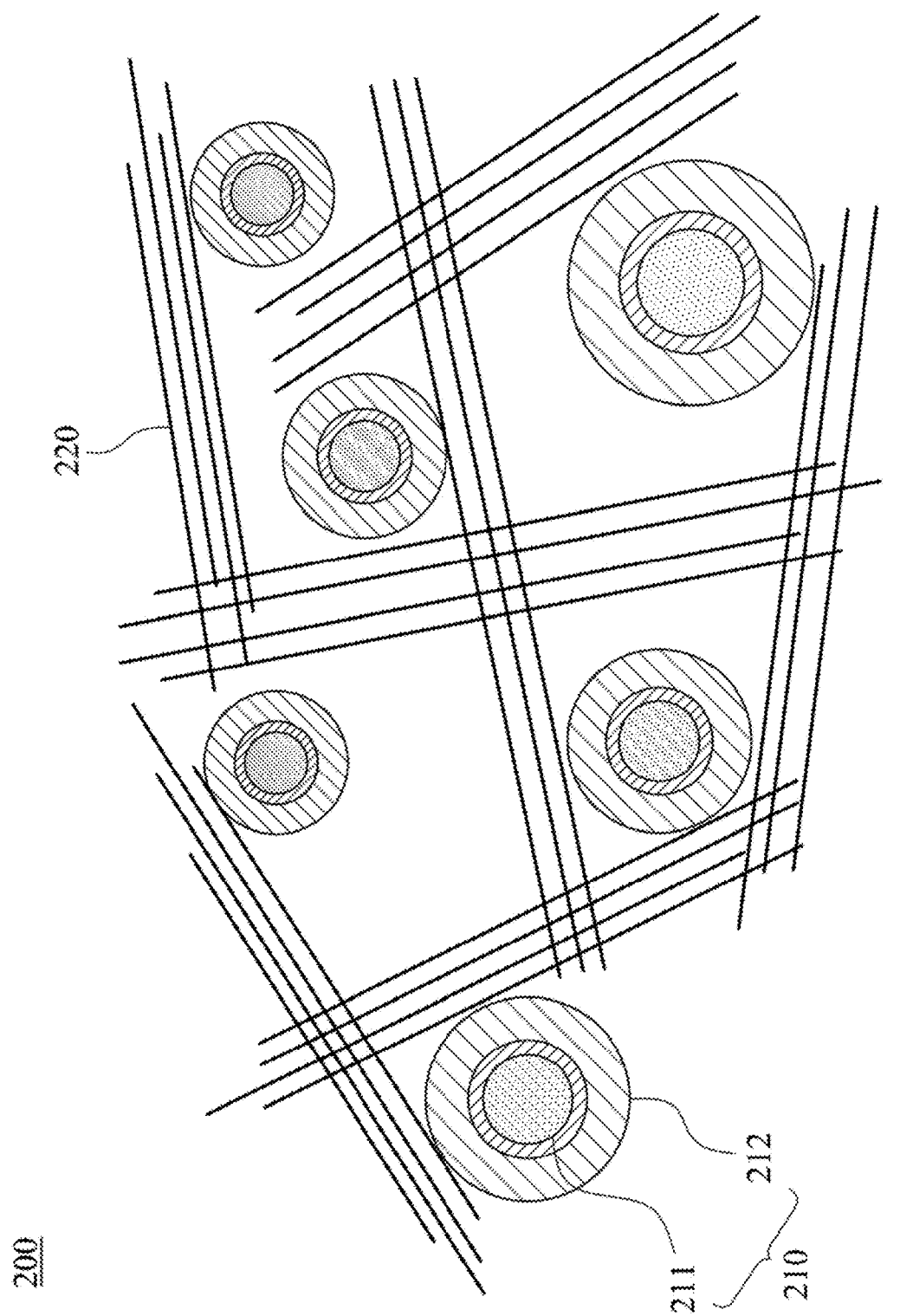
FIG. 3A shows the negative electrode material of the lithium battery of FIG. 2.

FIG. 3A shows a negative electrode material 200 of the lithium battery manufactured by the method(s) mentioned above. The negative electrode material 200 of the lithium battery includes a mixing of a plurality of silicon composite materials 210 and a plurality of graphene units 220. As described above, the structure of the silicon composite materials 210 includes a silicon material (Si particle) 211 and a composite layer 212 containing a metal silicide, a metal oxide, a silicon carbide and a silicon oxide formed on a surface of the silicon composite material 210. The silicon composite material 210 can be formed through the steps S101 and S102 as described above. Alternatively, the silicon composite material 210 can be formed after mixing the silicon materials in the Step S101 with the graphene units in the Step S104 then performing the thermal process.

Each of the graphene units 220 may include the same or different number of layers. The graphene unit 220 may be formed through the steps S103 as described above.

The negative electrode material 200 of the lithium battery can be formed by mixing the silicon composite materials 210 and the graphene units 220. The lithium battery using this kind of negative electrode material 200 has superior performance than conventional lithium battery, and the problems of conventional lithium battery can also be solved. This will be described in the following paragraphs.

In more detail, for achieving the purpose of the Step S101, in an embodiment, a metal material (e.g. nickel) can be covered on the surface of the silicon material through an electroless plating process, and then mixing the silicon material with a carbon material (e.g. asphalt or pitch). In another embodiment, the silicon material, the carbon material and the metal material can be directly mixed, and in this way the metal material and the carbon material can also be covered on the surface of the silicon material. The metal material can be nickel, organic nickel compounds or nickel salts. In the embodiment, nickelous acetate is used.

Figure 3B:
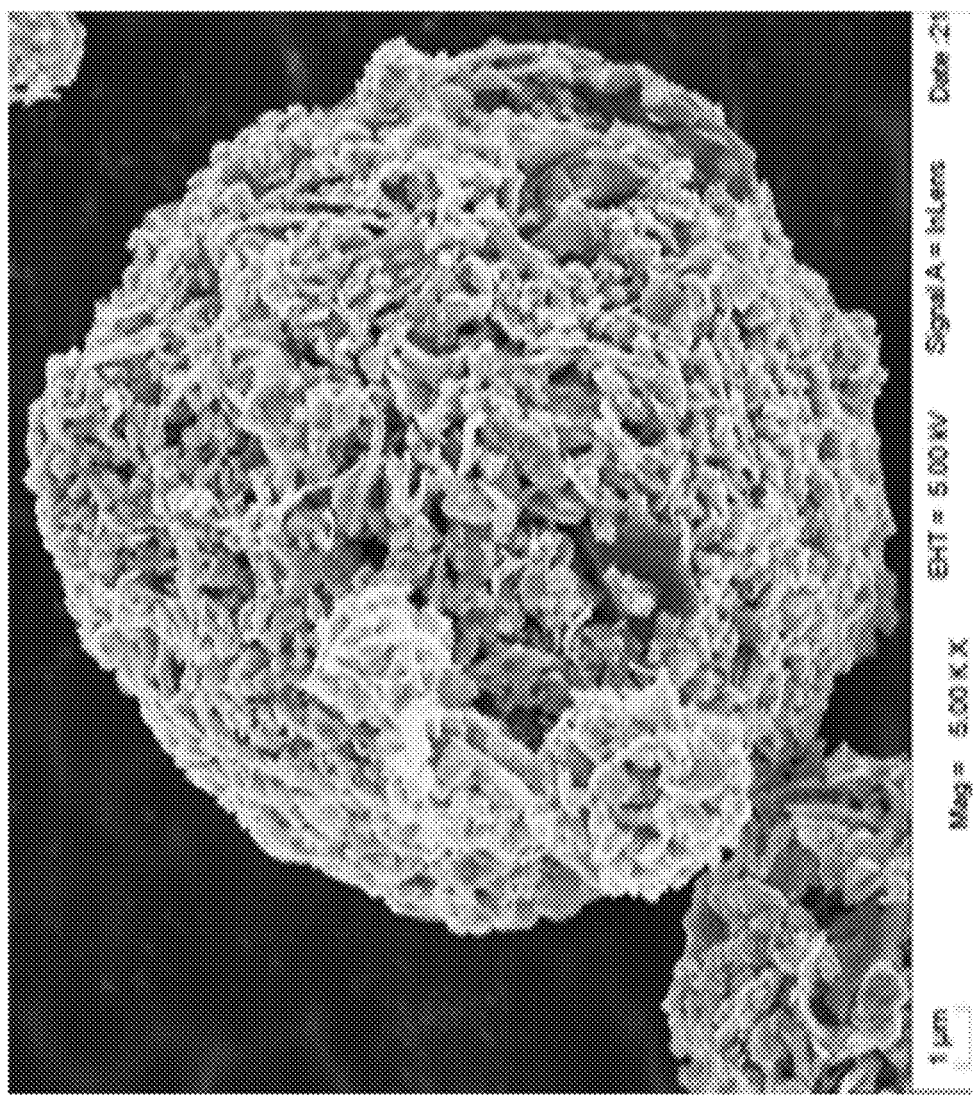
FIG. 3B is a Transmission Electron Microscopy (TEM) diagram showing the negative electrode material of the lithium battery.

In a preferred embodiment, after finishing the aforementioned Step S101, the pretreated silicon material may be mixed with the graphene units 220 produced in the Step S103, then it is preferred to perform a drying process and a spheroidizing process, and then perform the thermal process in the Step S102 to form a plurality of ball-shaped negative electrode materials of the lithium battery (Shown in FIG. 3B). Each of the ball-shaped negative electrode materials of the lithium battery has a diameter within 5 and 15 μm. In this way, the carbon material can be covered on the surface of the graphene units 220.

Carbon-based materials are widely used as negative electrode materials of lithium batteries nowadays. However, this kind of negative electrode material cannot meet the requirement of high capacity of the lithium battery. In the present disclosure, silicon material 211 is used as the negative electrode material of the lithium battery, thus the capacity can be dramatically increased. However, in a charge-discharge process, the volume of the silicon material 211 will expand, thereby lowering the performance of the lithium battery. Moreover, an electric conductivity between each of the silicon materials 211 is limited. Accordingly, in the negative electrode material 200 of the lithium battery of the present disclosure, the silicon material 211 further be covered with the composite layer 212. The composite layer 212 contains metal alloy such as nickel silicide and nickel oxide. The excellent electric conductivity of these metal alloys can dramatically increase the electric conductivity of the silicon material 211. Moreover, the ductility of these metal alloys can suppress the volume expansion of the silicon material 211, and the silicon carbide may act as a buffer to the stress. In other words, the metal alloys and the silicon carbide can resist the volume expansion of the silicon material 211, thus the problem of the low charge-discharge efficiency caused by the volume expansion of the silicon material 211 can be solved. Furthermore, a plurality of projections 213 are formed on the surface of the silicon material 211, and each of the projections 213 has a length within 10 nm and 800 nm. A free end of each of the projections 213 is enlarged to form a head 213A, and a body 213B is connected between the surface of the silicon material 211 and the head 213A. In the embodiment, the body 213B includes silicon, and the head 213A includes nickel, thereby changing the structure of the silicon material 211, and also it is beneficial to solve the problem of the low charge-discharge efficiency caused by the volume expansion of the silicon material 211. Moreover, the negative electrode material 200 of the lithium battery contains a mixing of the silicon composite materials 210 and the graphene units 220. Utilizing the unique material characteristics of the graphene unit, the electric conductivity can be further increased, and the charge-discharge retention and the lifetime can be also increased. It should be mentioned that since the carbon material is on the surface of the silicon material 211 at the Step S101, the surface of the silicon material 211 and the projections 213 formed thereon after the thermal process will be also coated with the carbon material 214. In the embodiment, the carbon material 214 is an amorphous carbon layer.

In the following paragraphs, experimental data are shown to demonstrate the influence of the method on the material characteristics and the performance of the lithium battery which using the negative electrode material 200.

Figure 4A:
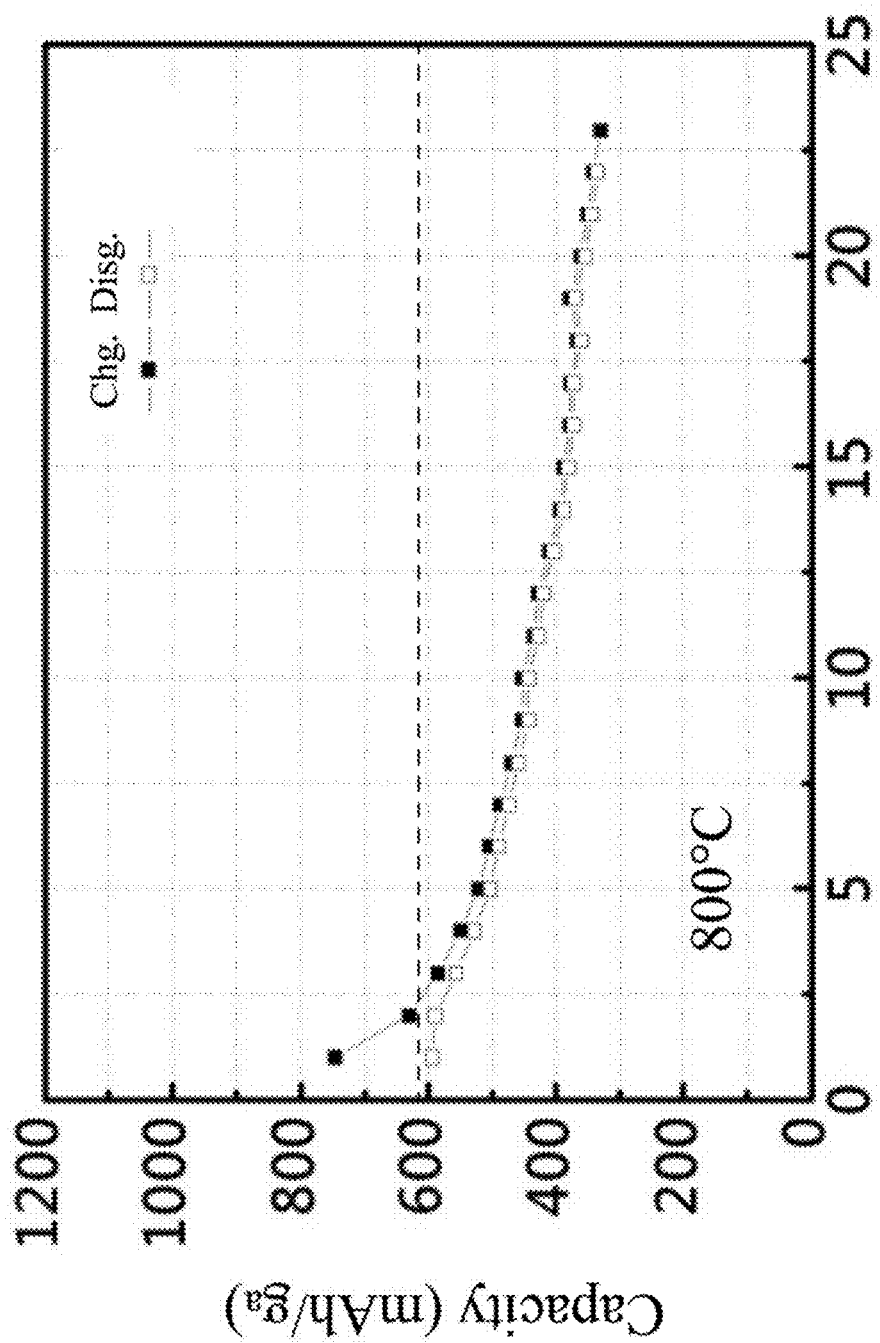
FIGS. 4A to 4B are comparison diagrams showing the charge-discharge efficiency of a lithium battery under different thermal conditions.
Figure 4B:
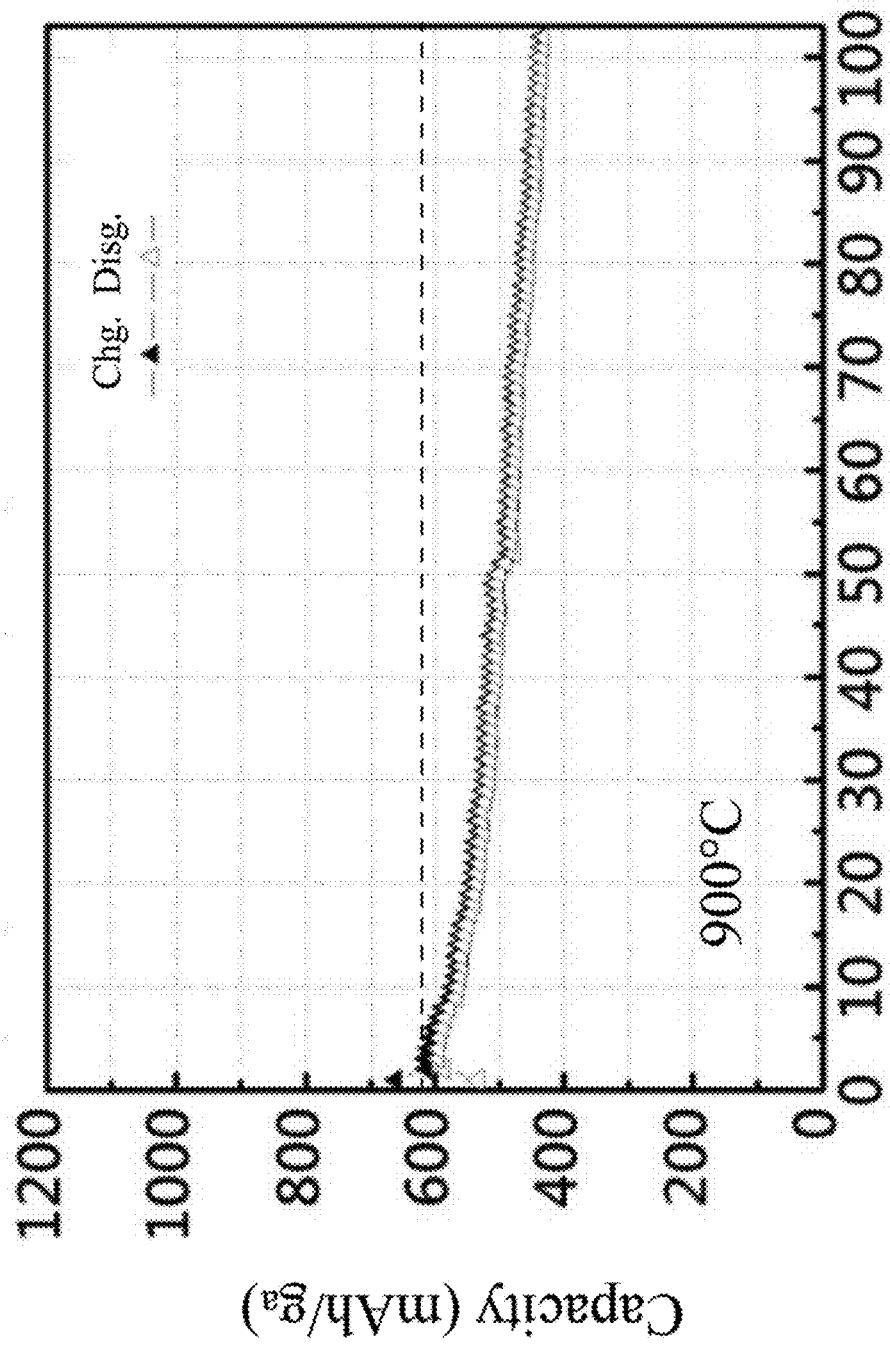

In FIGS. 4A and 4B, CMC binders are used, the influences of different temperatures (800° C. and 900° C. respectively) of the thermal process on the charge-discharge efficiency are shown. From FIGS. 4A and 4B, a better charge-discharge capacity retention rate can be obtained at 900° C.; this is due to the formation of the silicon carbide at higher temperature.

Figure 5A:
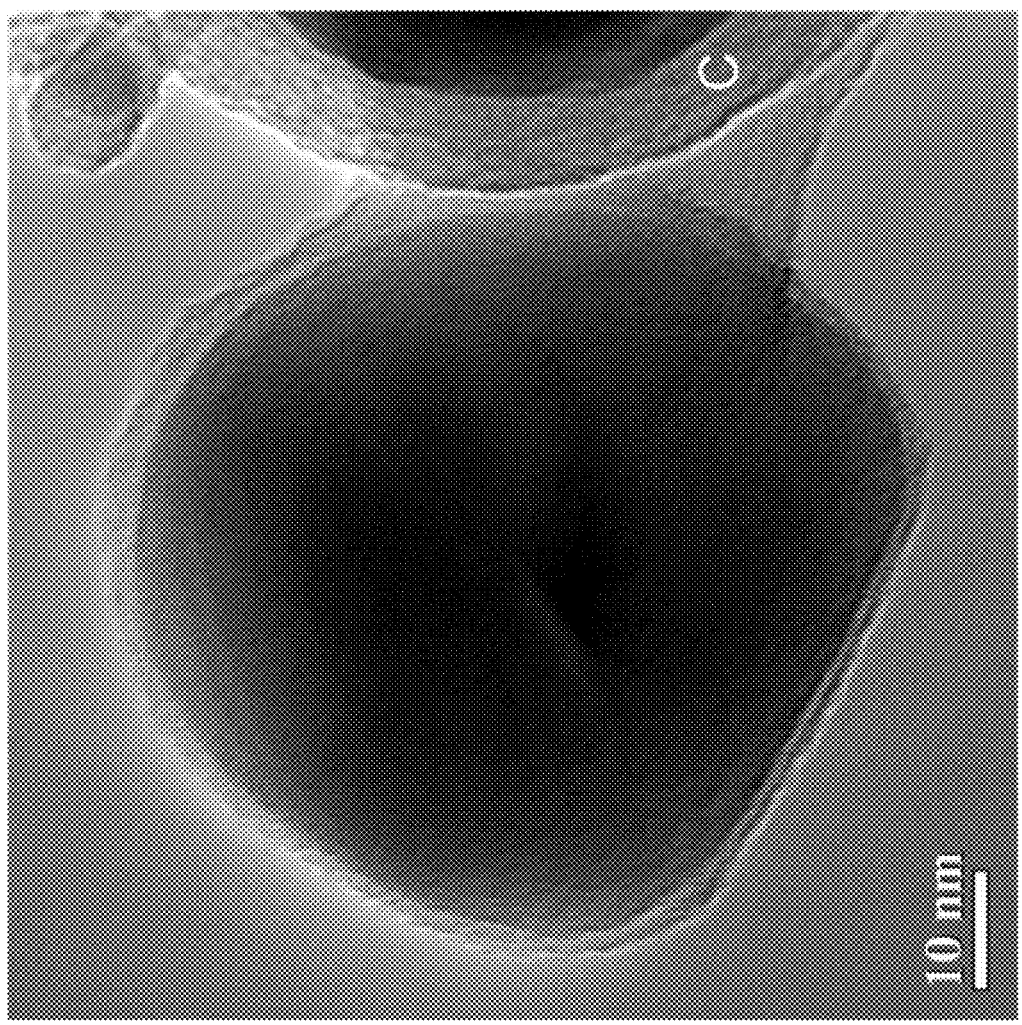
Figure 5B:
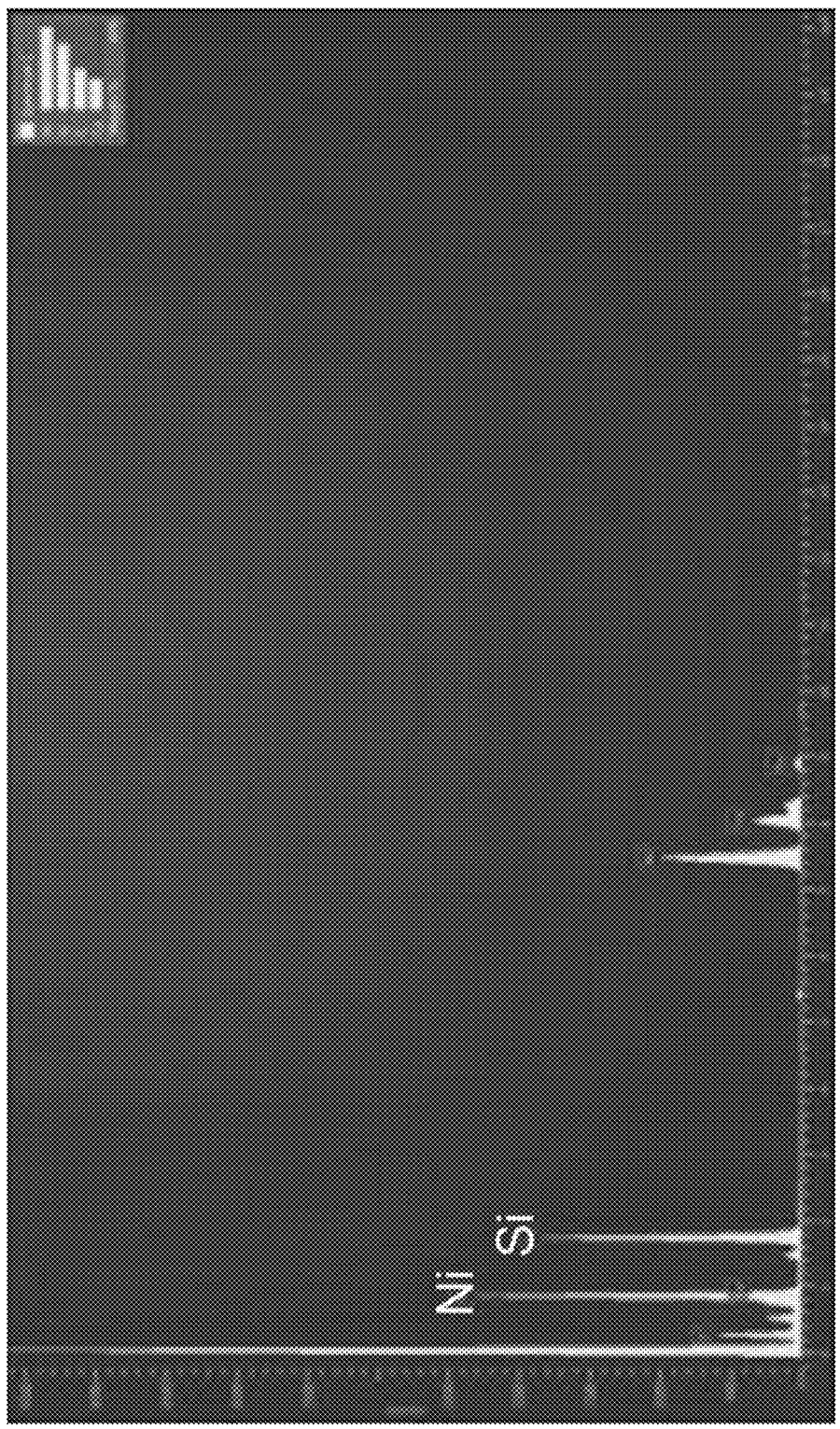
Figure 5D:
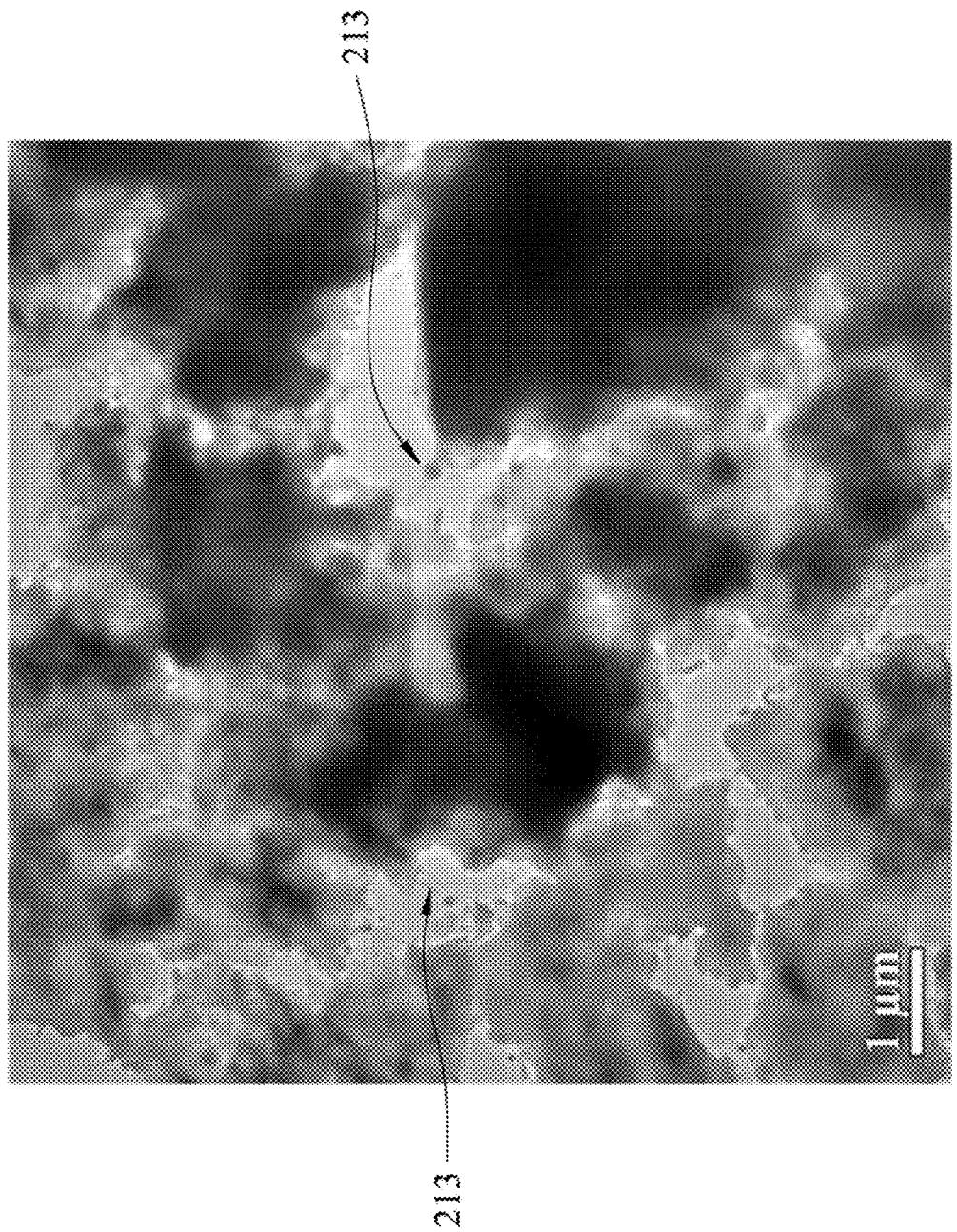
Figure 5E:
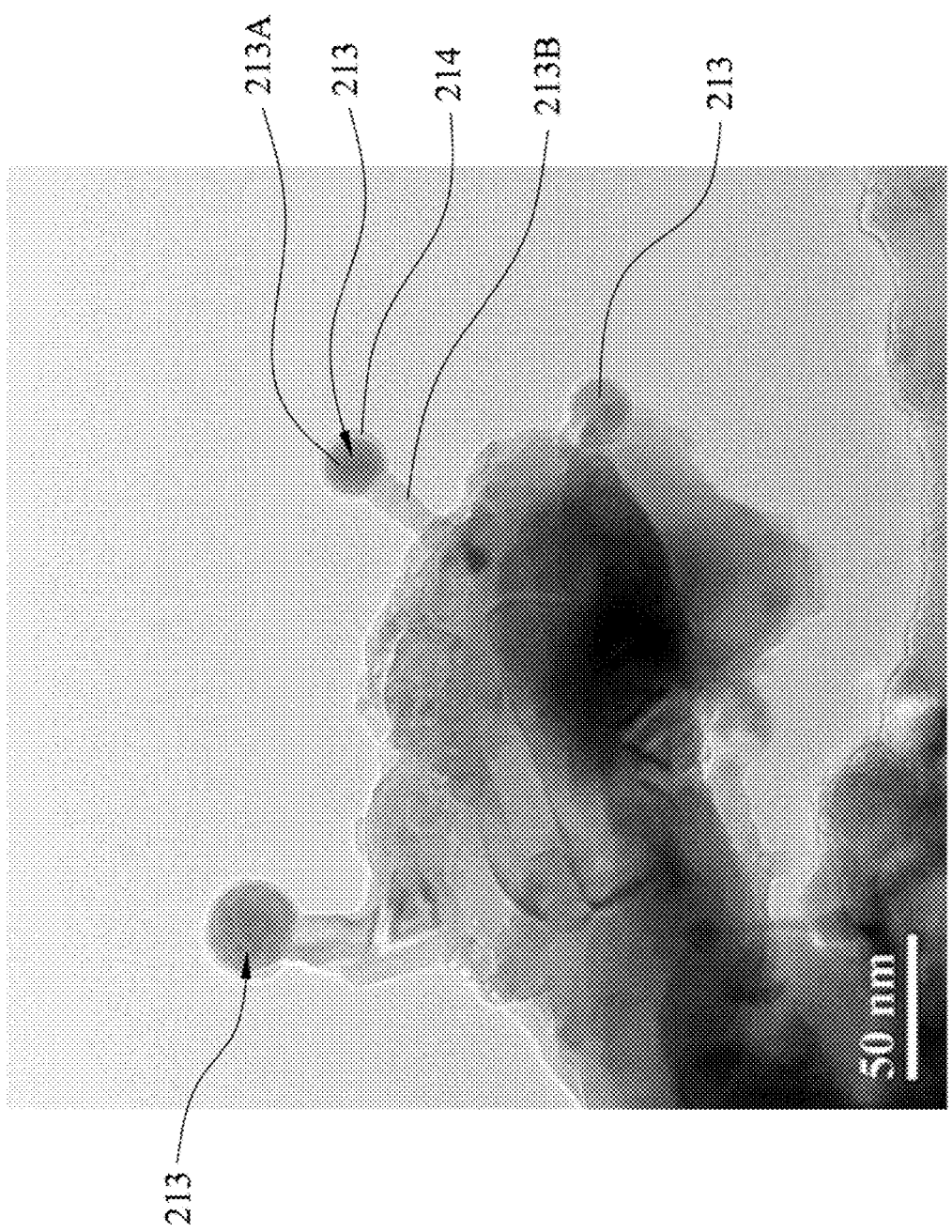
Figure 5F:
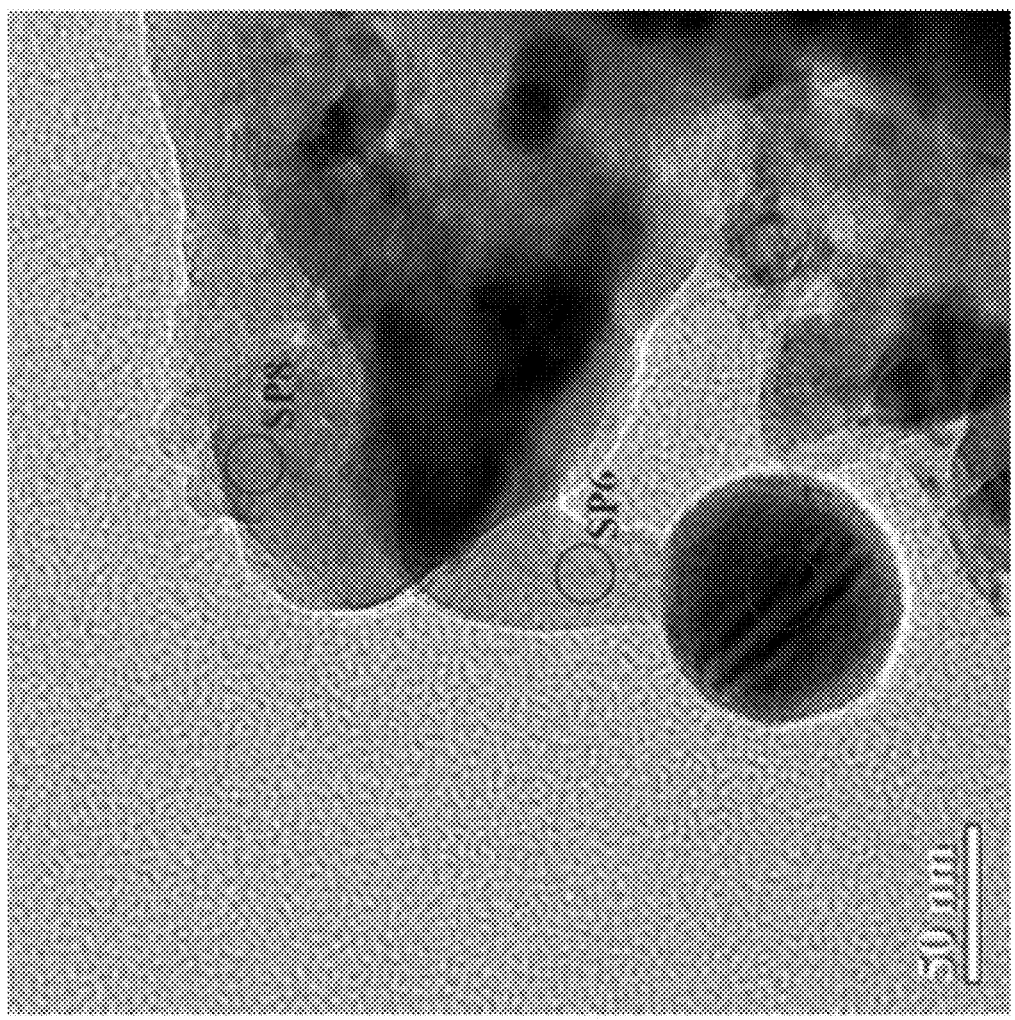
Figure 5G:
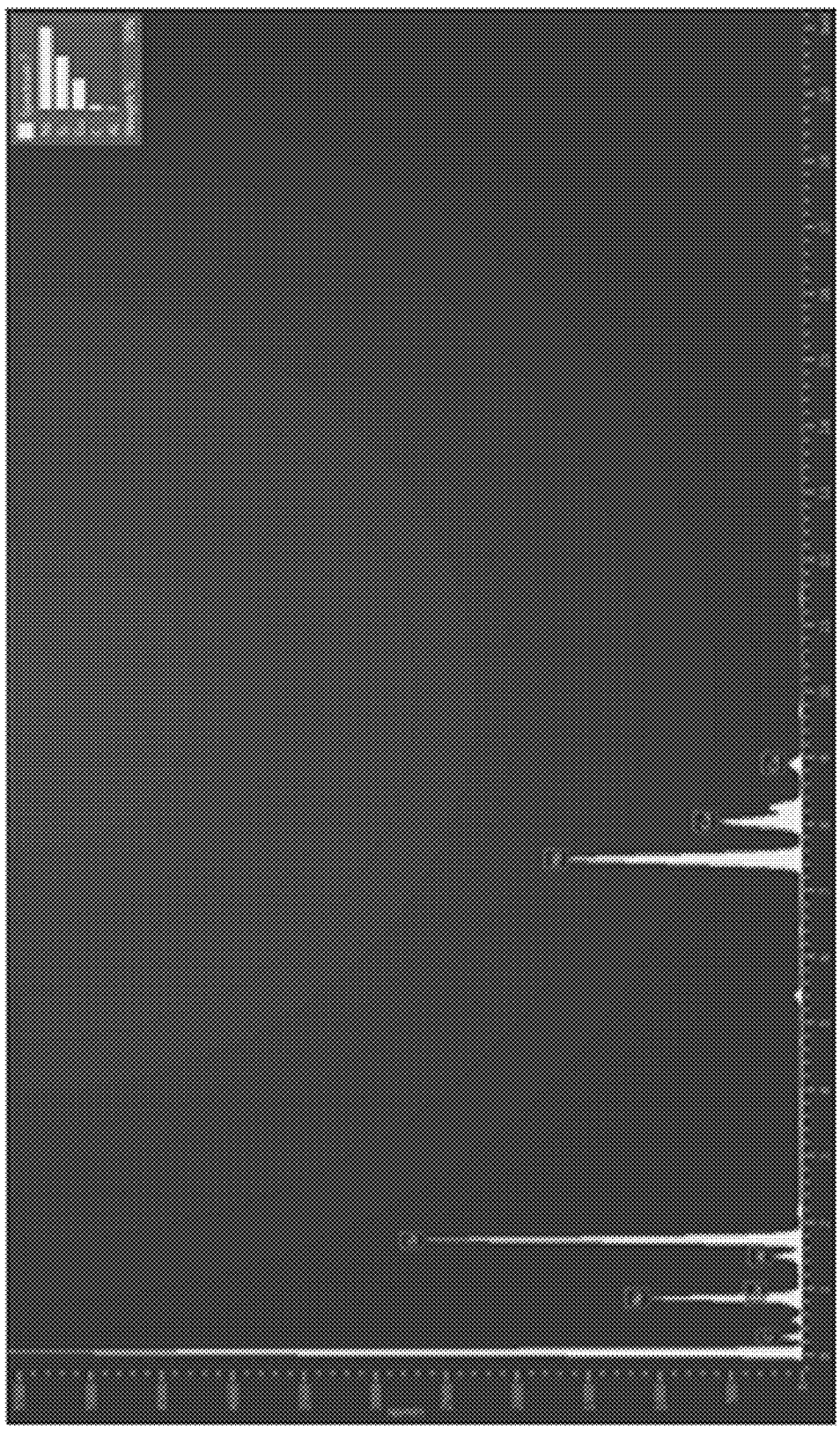

FIGS. 5A and 5G show that the formation of a composite layer on the surface of the silicon material 211, and the composite layer contains Ni, Si and C. In other words, the nickel oxide, the nickel silicide, the silicon carbide and the silicon oxide are indeed formed. The signal of oxygen is too small to be shown. However, it is commonly known that the silicon oxide will be formed after the thermal process. Furthermore, in FIGS. 5A (an enlarged view of FIG. 5C), 5C, 5D and 5E, it is clearly shown that the projections 213 are formed, and the projection 213 has a silicon-contained body 213B and a metal-contained (e.g. nickel and/or nickel compound) head 213A enlarged from the body 213B (shown in FIGS. 5F and 5G); the projections 213 are also covered with the carbon material 214 (shown with a label "C" in FIG. 5A).

Figure 6:
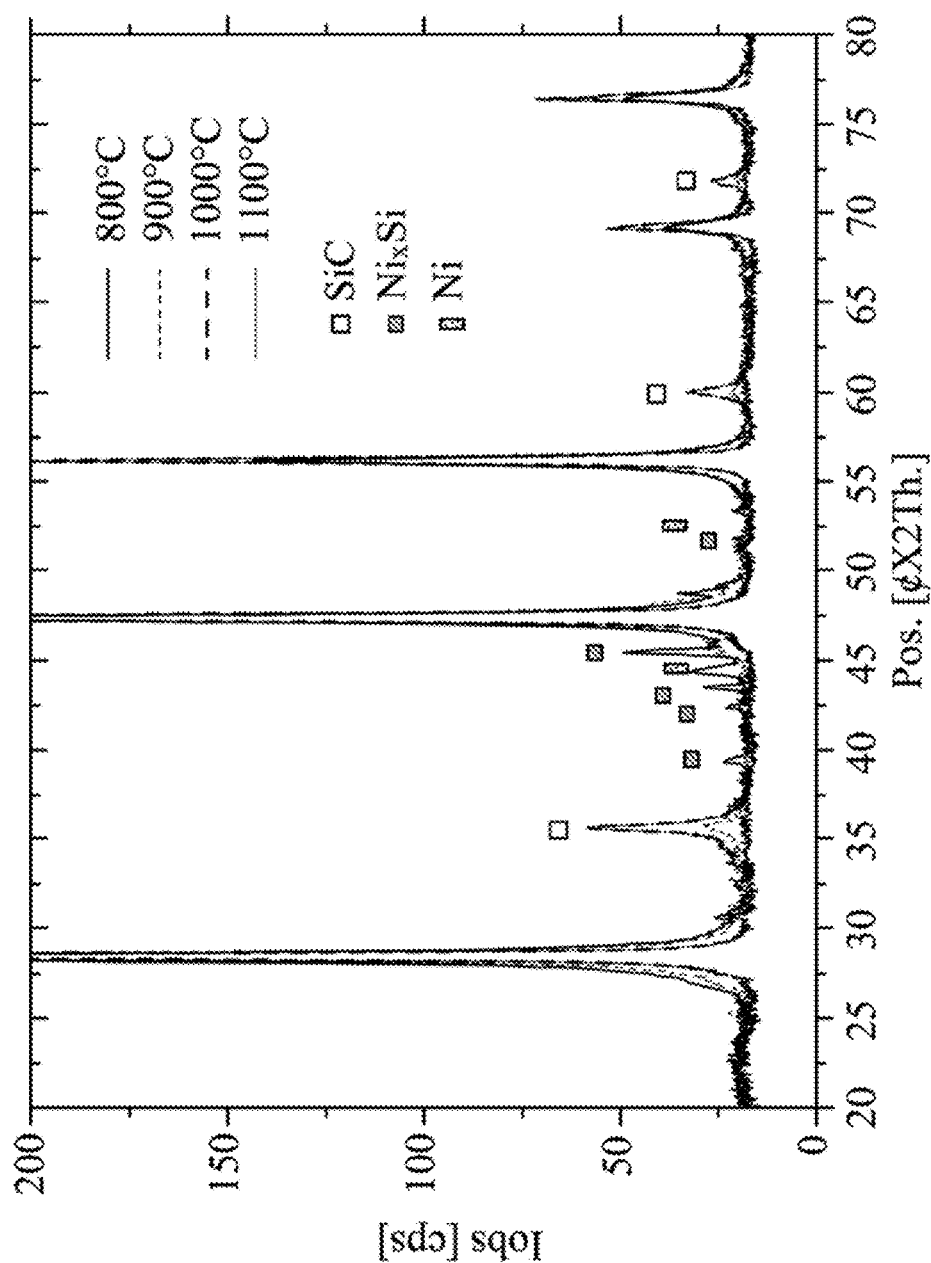
FIG. 6 is a comparison diagram of X-ray diffraction spectra of a negative electrode material under different thermal conditions.

In FIG. 6, the X-ray diffraction spectra show changes of the material characteristic after performing different thermal processes. For example, the signal of the nickel silicide decreases with the increase of the temperature. On the contrary, the signal of the silicon carbide increases with the increase of the temperature. It is also shown that the silicon carbide will be formed when the temperature of the thermal process is greater than 800° C.

Figure 7:
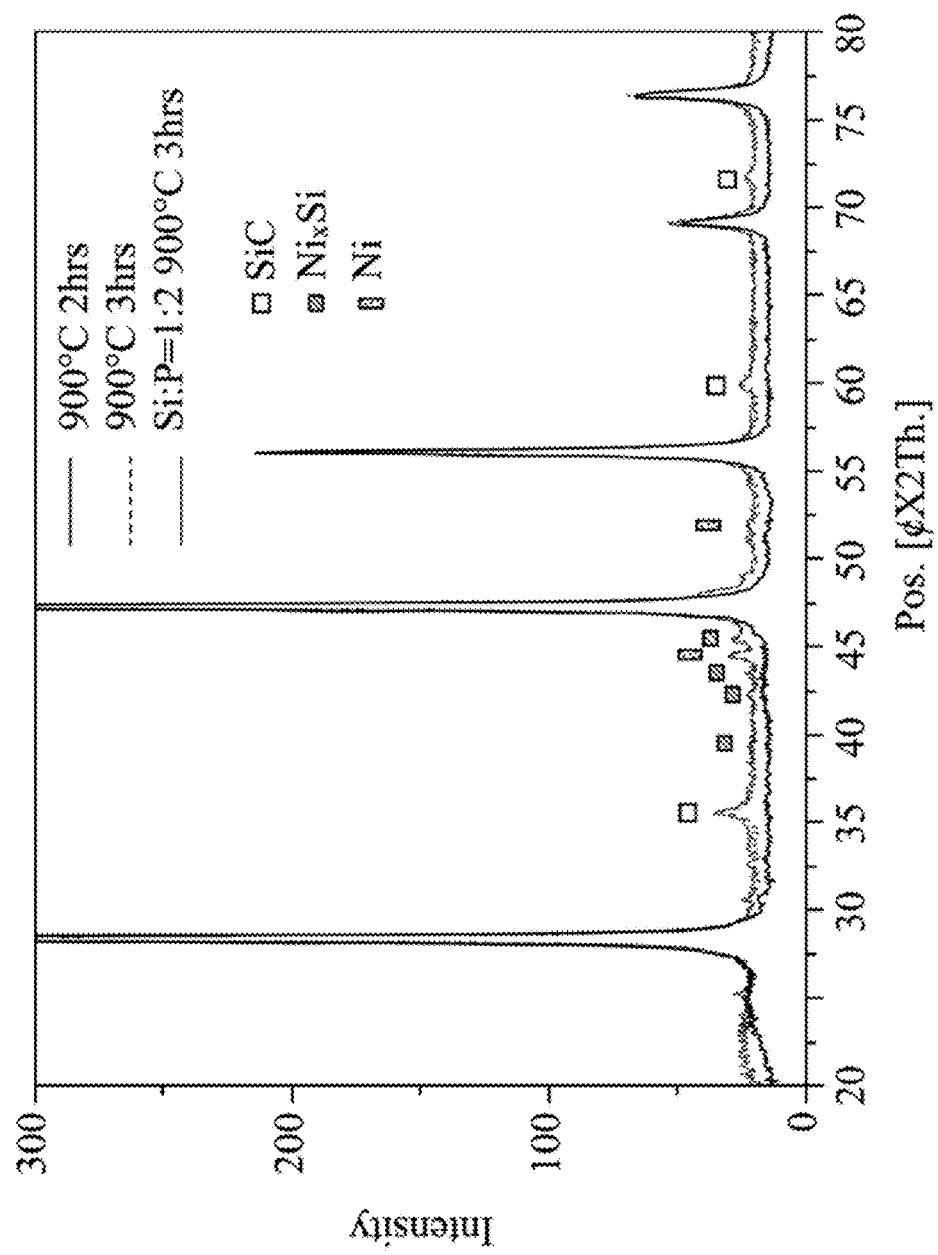
FIG. 7 is a comparison diagram of X-ray diffraction spectra of a negative electrode material with and without performing an ELP process.
Figure 8A:
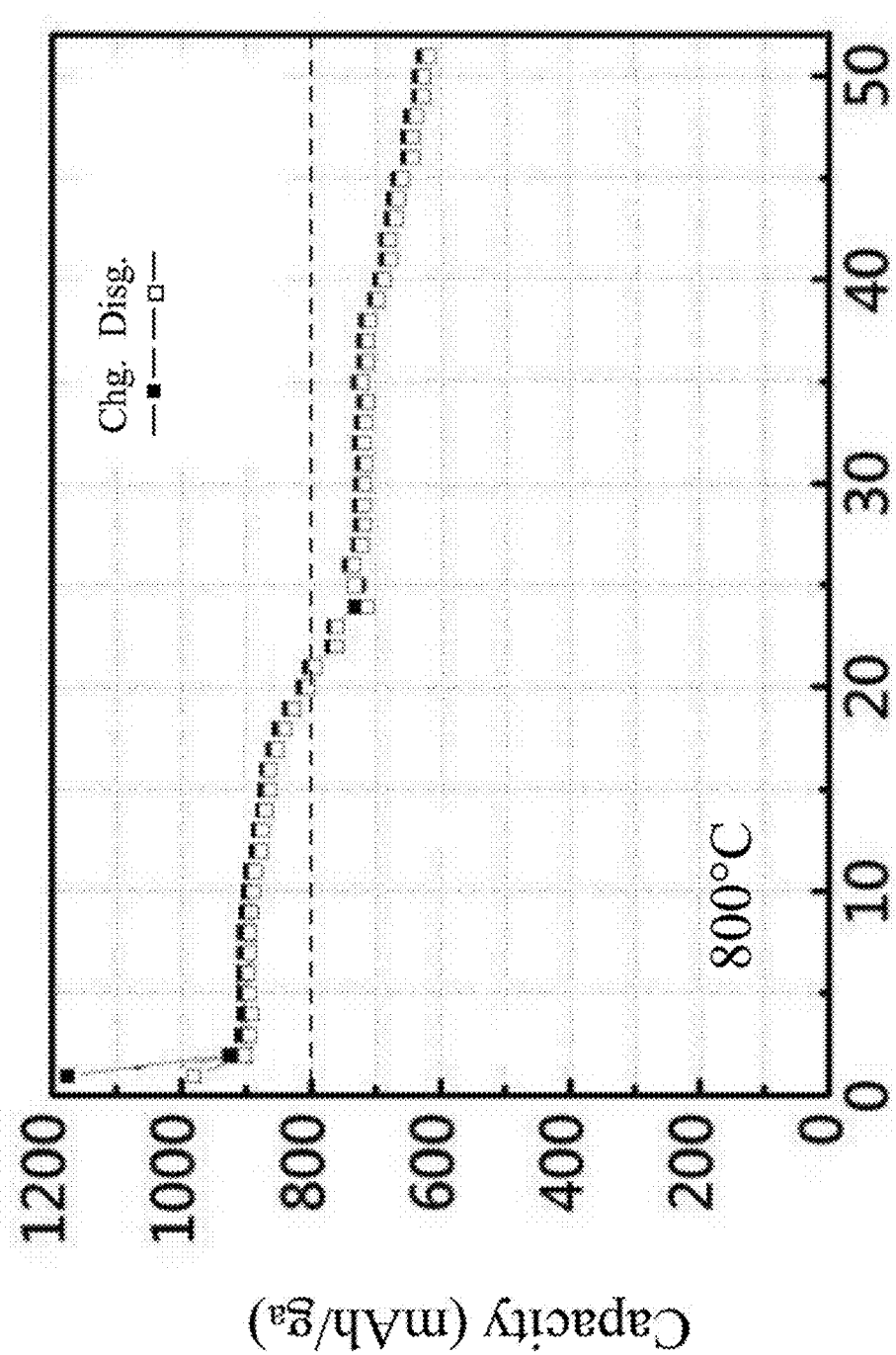
FIGS. 8A to 8D are comparison diagrams showing the charge-discharge efficiency of lithium batteries performing different thermal processes.
Figure 8B:
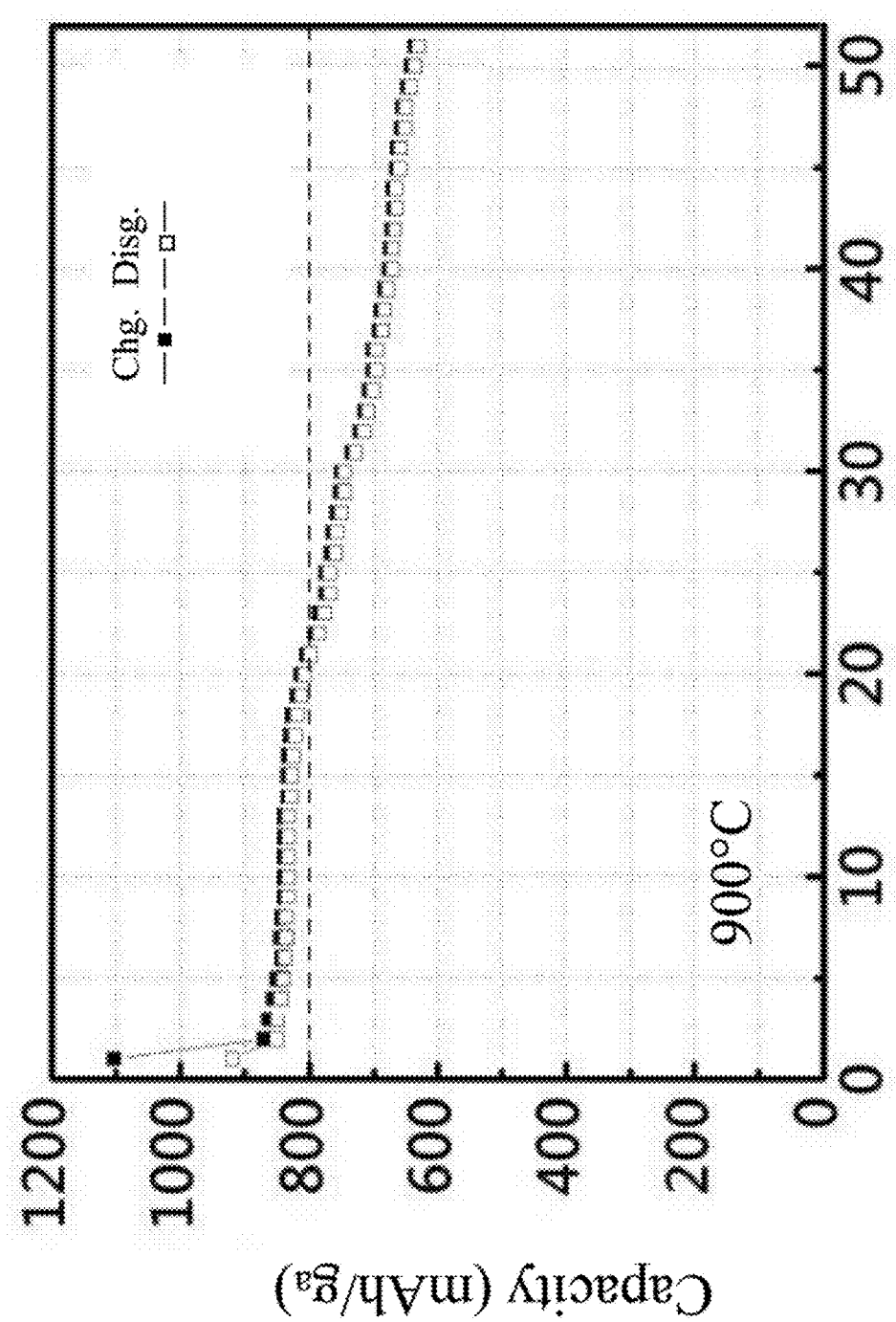
Figure 8C:
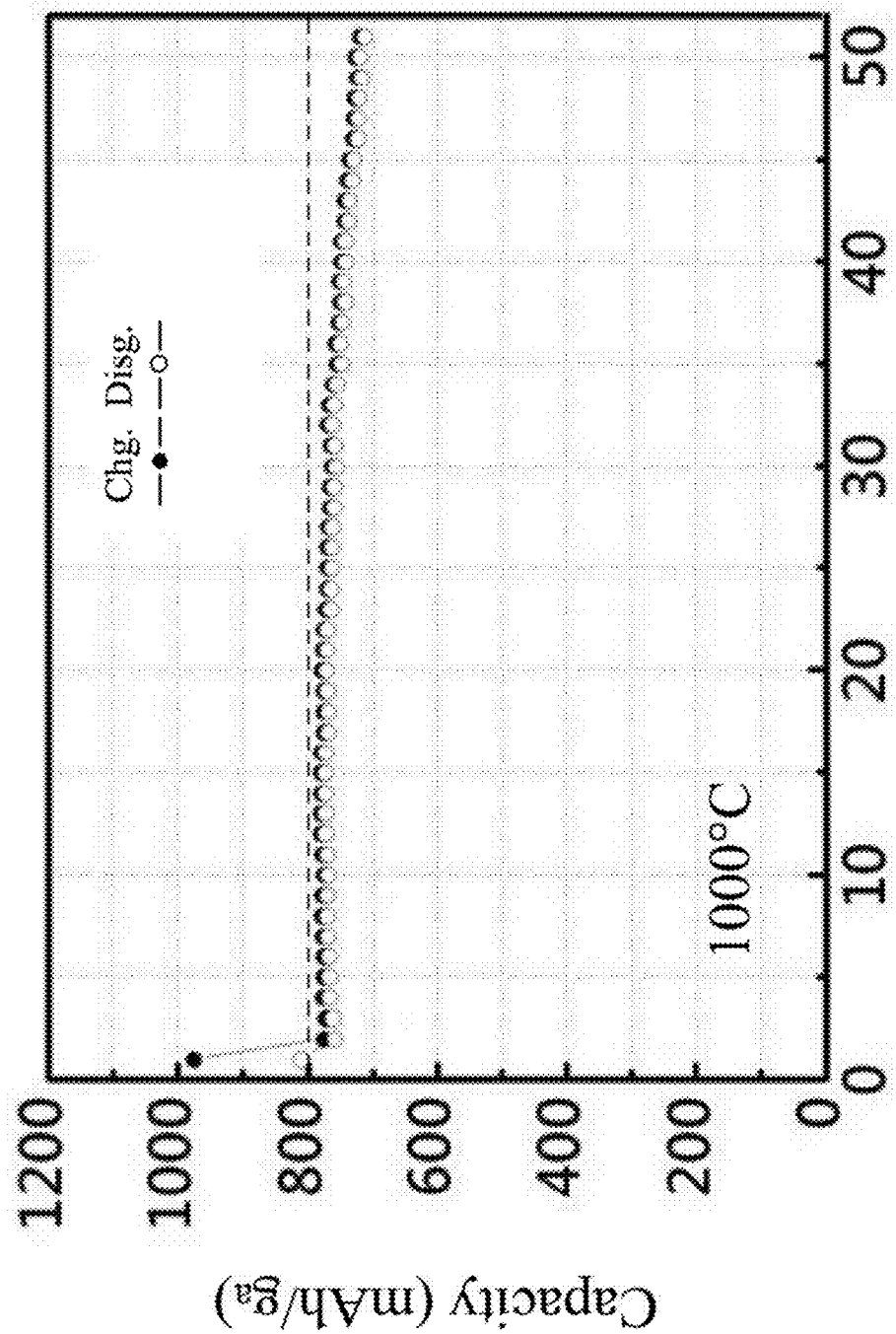
Figure 8D:
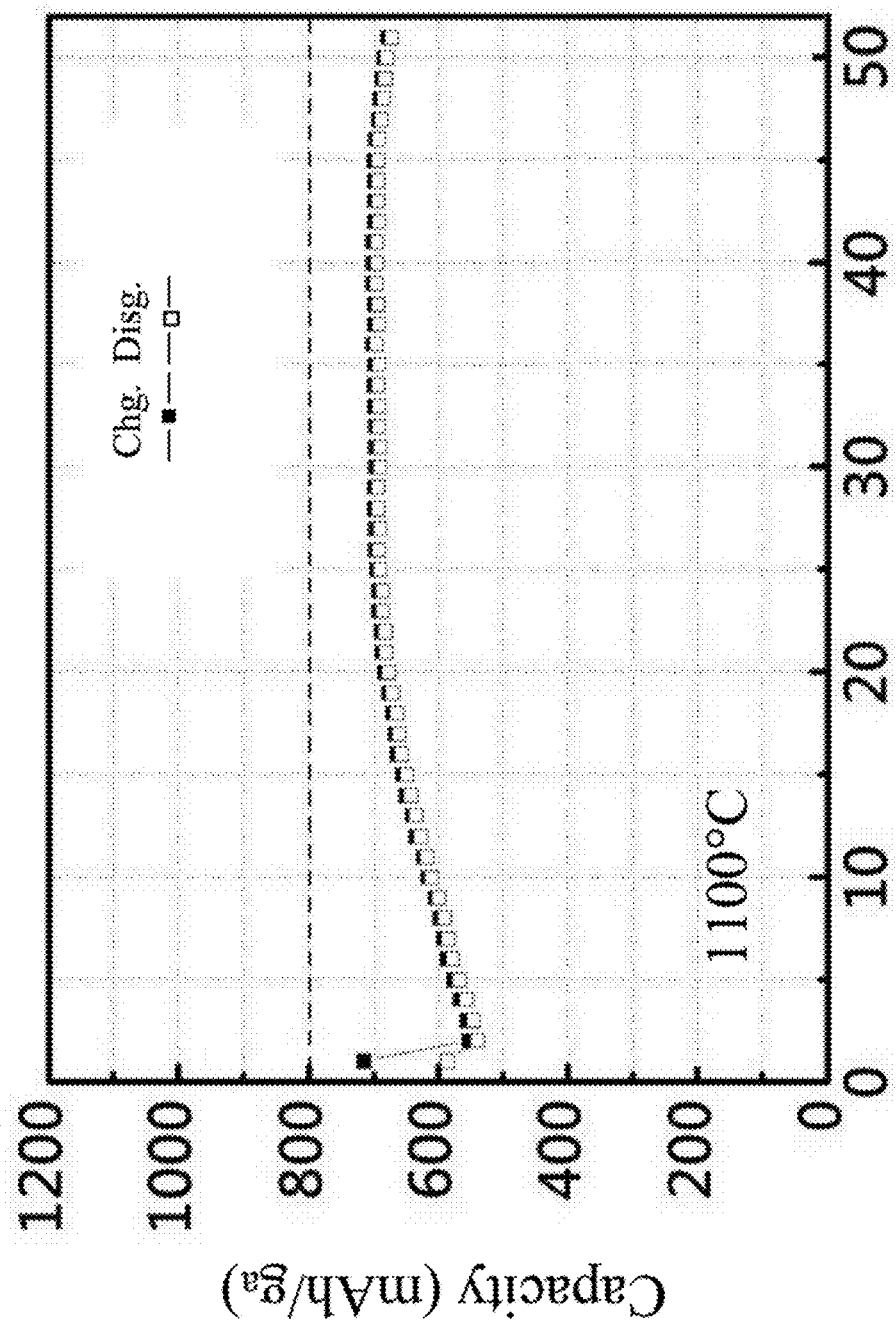

In FIG. 7, the X-ray diffraction spectra show a catalytic effect of the Ni metal on the formation of the silicon carbide. After performing an ELP (i.e., Electroless Plating) process, Ni metal will be attached and acts as an effective catalyst on the formation of the silicon carbide at 900° C. In FIG. 7, it is also shown that no silicon carbide is formed without the ELP process (refer to a thick solid line in FIG. 7).

From FIGS. 8A to 8D, the temperatures of the thermal process are 800° C., 900° C., 1000° C. and 1100° C., respectively, and the charge-discharge efficiency corresponding to each temperature are shown. Higher capacity will be obtained at 800° C. and 900° C., and a higher charge-discharge capacity retention rate can be obtained at 1000° C. Also, it is concluded that the formation of the silicon carbide at higher temperature can increase the charge-discharge capacity retention rate.

Figure 9:
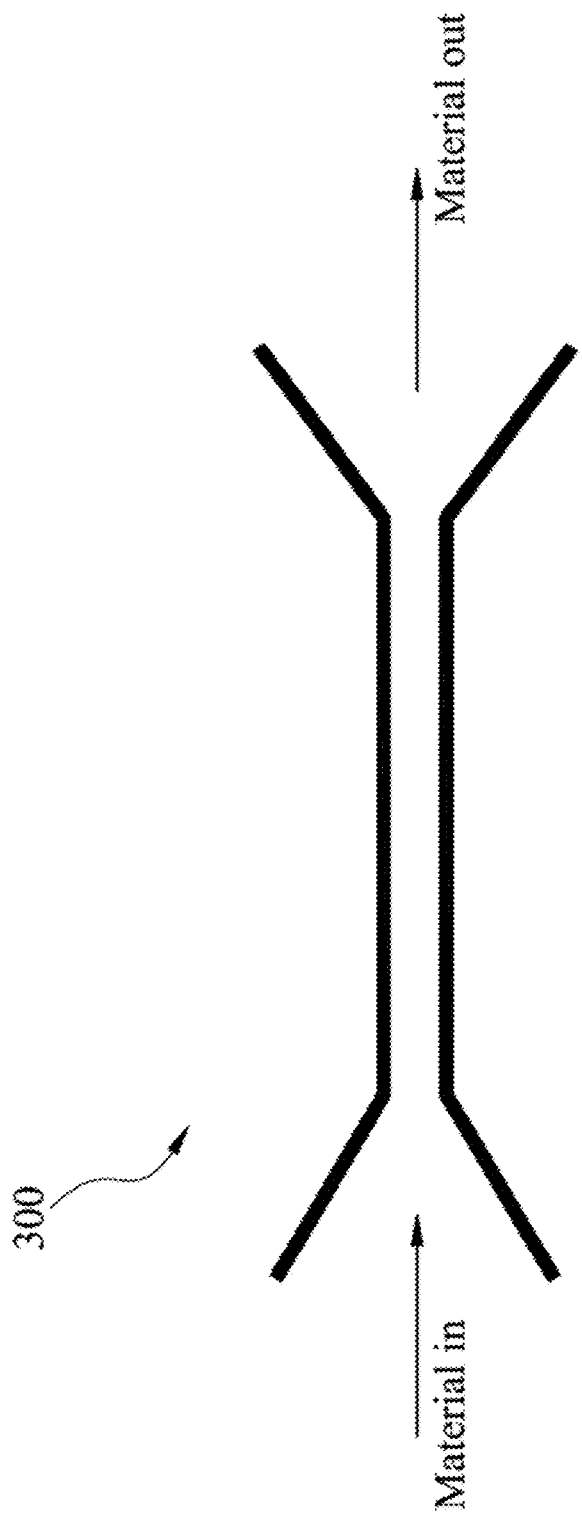
FIG. 9 shows a high pressure channel according to one embodiment of the present disclosure.

The graphene units 220 in FIG. 3 are formed by passing the graphite material through the high pressure channel 300. In one example, as illustrated in FIG. 9, the high pressure channel 300 has a narrow channel with width less than 100 μm, and may be made of diamond. When the graphite material is passed through the high pressure channel 300, the graphite material is rubbed with the high pressure channel 300 thereby stripping a plurality of multi-layer graphene from the graphite material. Each of the graphene units 220 includes the same or different number of graphene layers. Finally, the negative electrode material 200 for the lithium battery is formed by mixing the silicon composite materials 210 with the graphene units 220. In one example, the mixture of the graphene units 220 and the silicon composite materials 210 will be further passed through the high pressure channel 300 to uniformly mix the graphene units 220 and the silicon composite materials 210.

Figure 10:
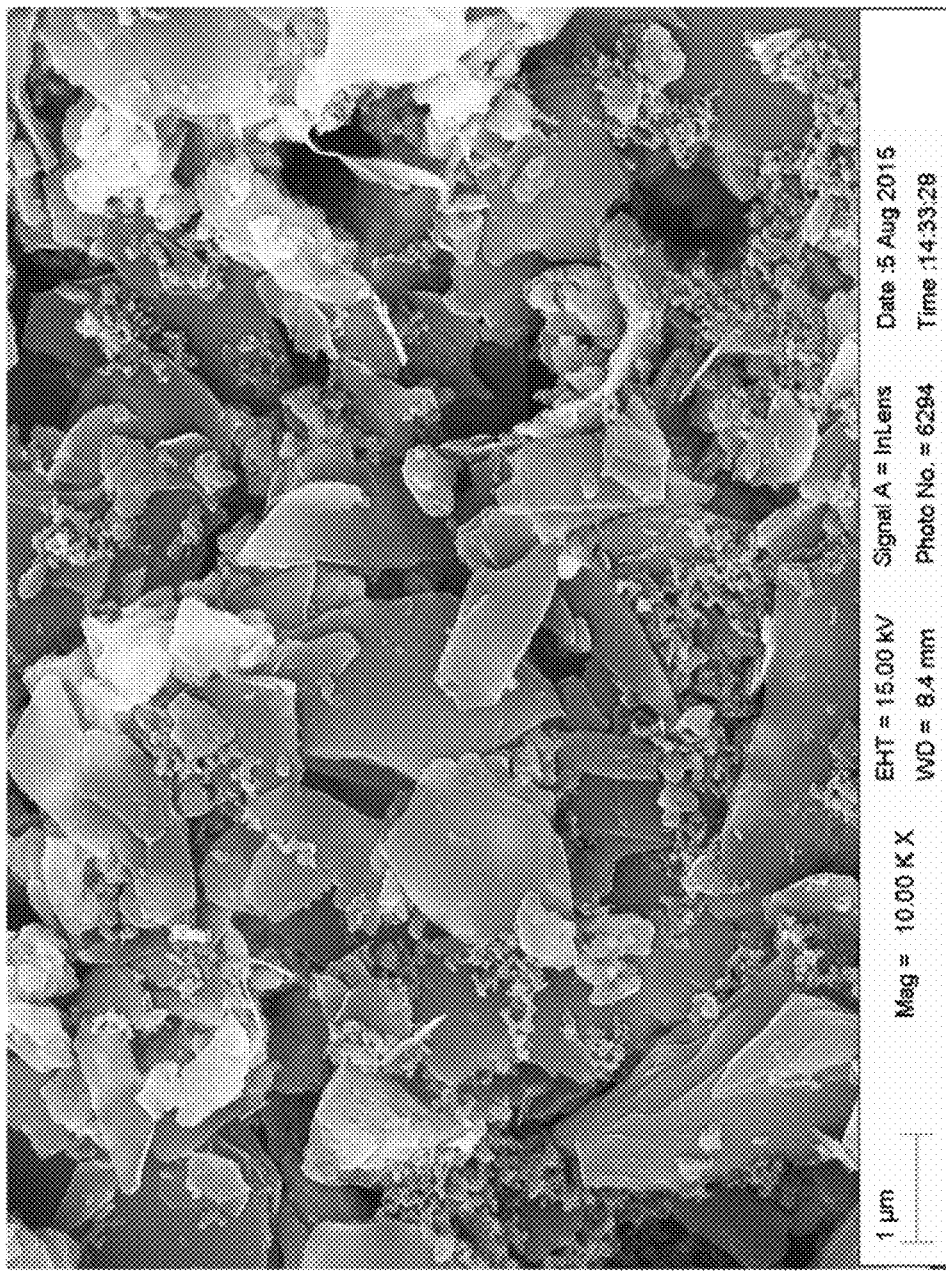
FIG. 10 shows multi-layer graphene sheets are formed after passing a graphite material through the high pressure channel of FIG. 9.

In FIG. 10, a plurality of sheet-like multi-layer graphene layers stripped from the graphite material can be shown.

Figure 11:
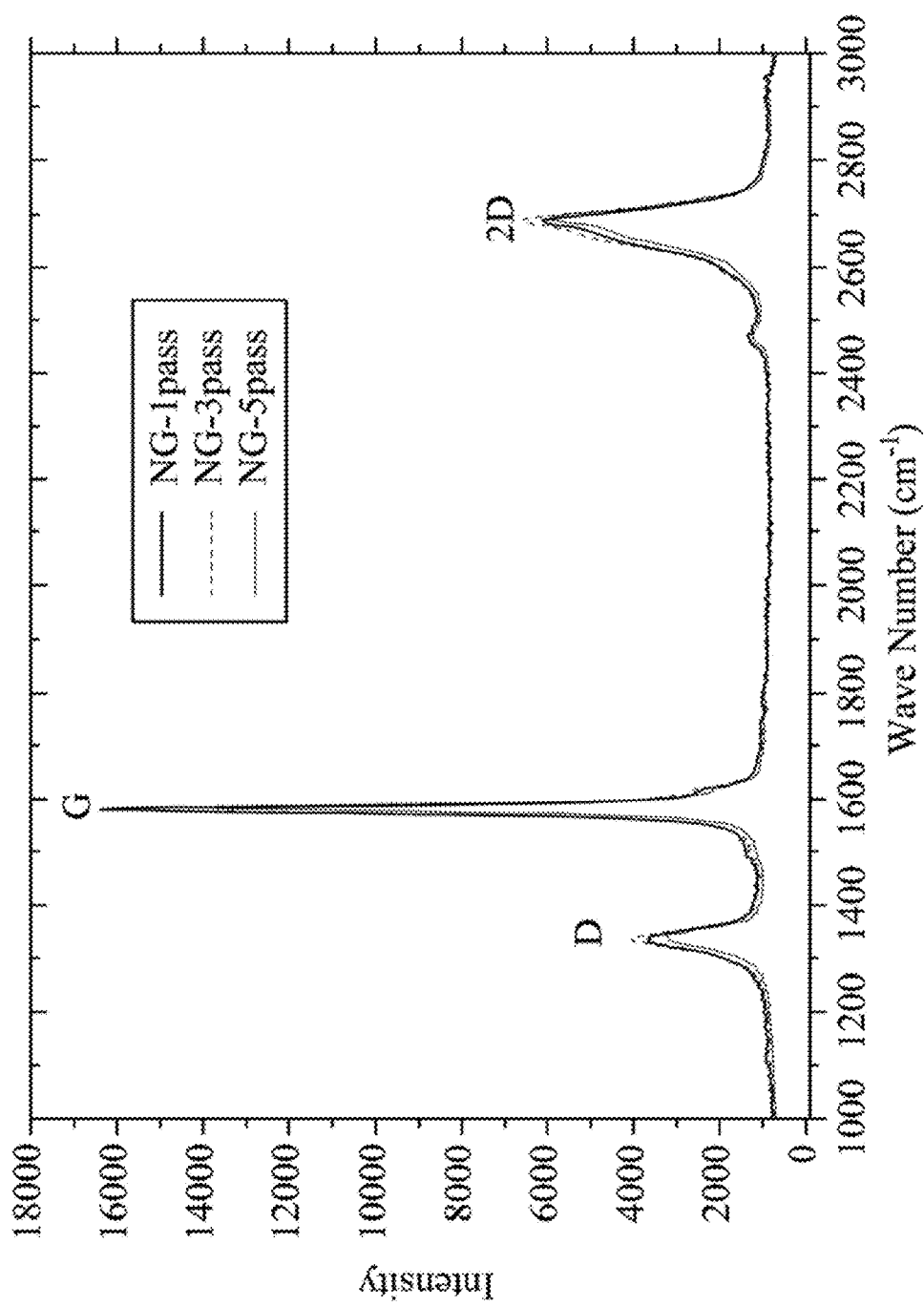
FIG. 11 is a Raman spectroscopy showing multi-layer graphene being formed after repeatedly passing the graphite material through the high pressure channel.
Figure 12:
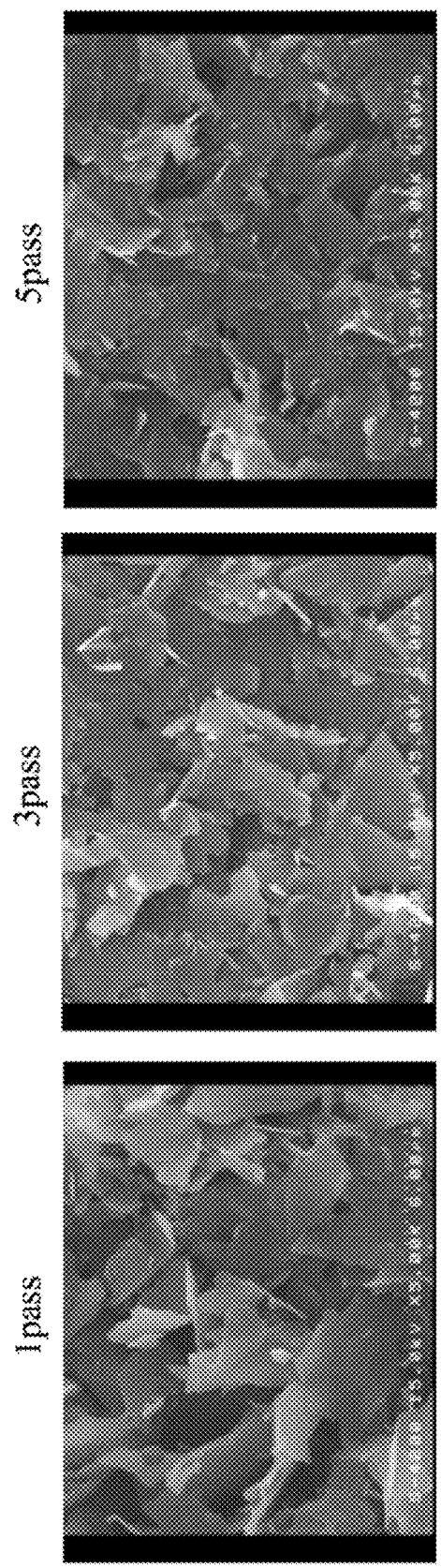
FIG. 12 is a Transmission Electron Microscopy (TEM) diagram showing repeatedly passing the graphite material through the high pressure channel with different number of passes.

In FIGS. 11 and 12, the influences of the number of passes of passing the graphite material through the high pressure channel 300 are shown. The numbers of passes are 1 pass, 3 pass and 5 pass, respectively. In FIG. 12, fewer layers graphene will be obtained with the increasing number of passes. This result is corresponded to the Raman spectroscopy shown in FIG. 11. In FIG. 11, the signal of 1D (one dimensional) and 2D (two dimensional) on the Raman spectroscopy increase with increasing number of passes. In FIG. 11, the signal intensity ratio $I_{2D}/I_G$ is about 0.34~0.37, showing that 10~20 layers graphene are formed, the same result can also be found in the TEM diagrams described above.

Figure 13A:
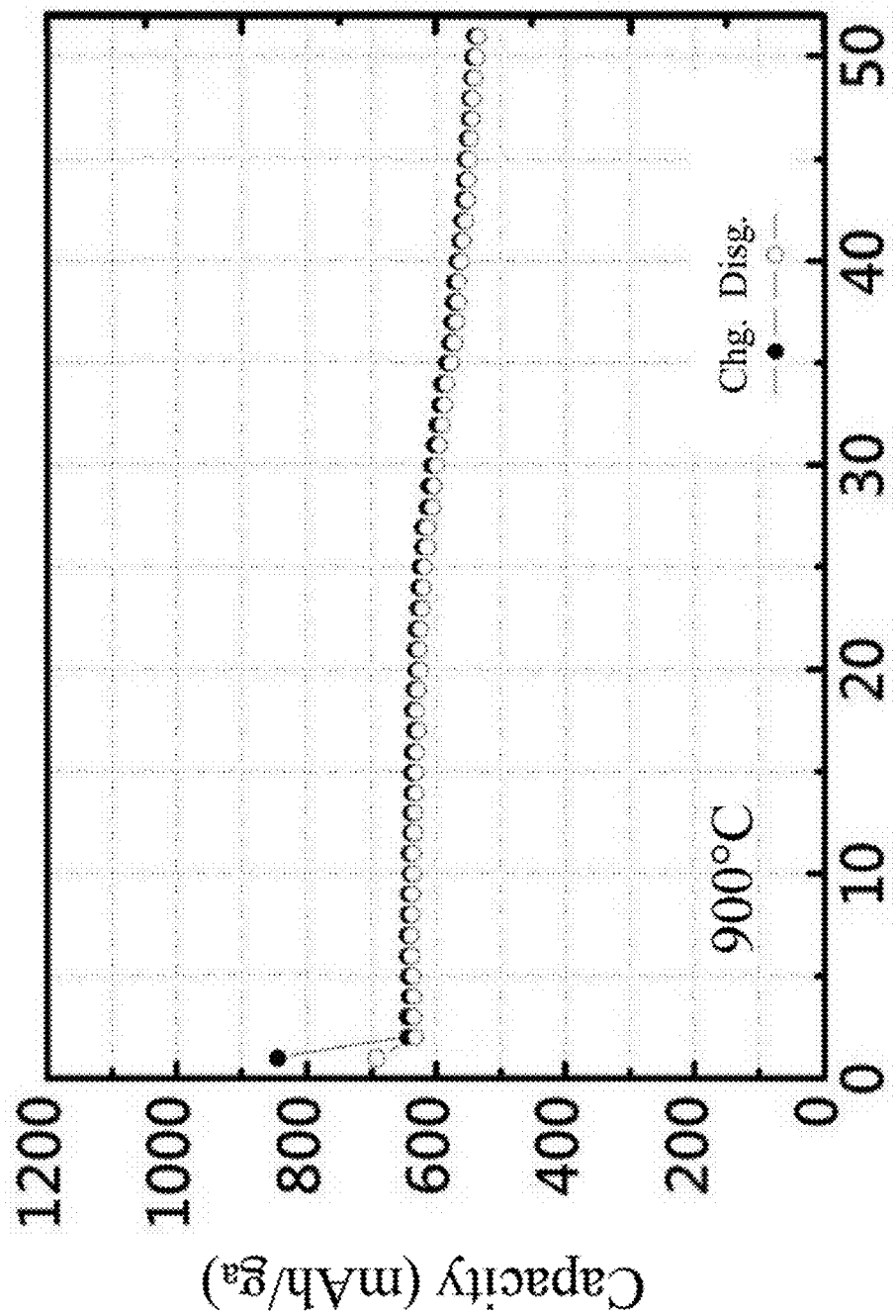
FIGS. 13A to 13B are comparison diagrams showing the charge-discharge efficiency of the lithium batteries with and without mixing the silicon composite materials and graphene units by passing the high pressure channel.
Figure 13B:
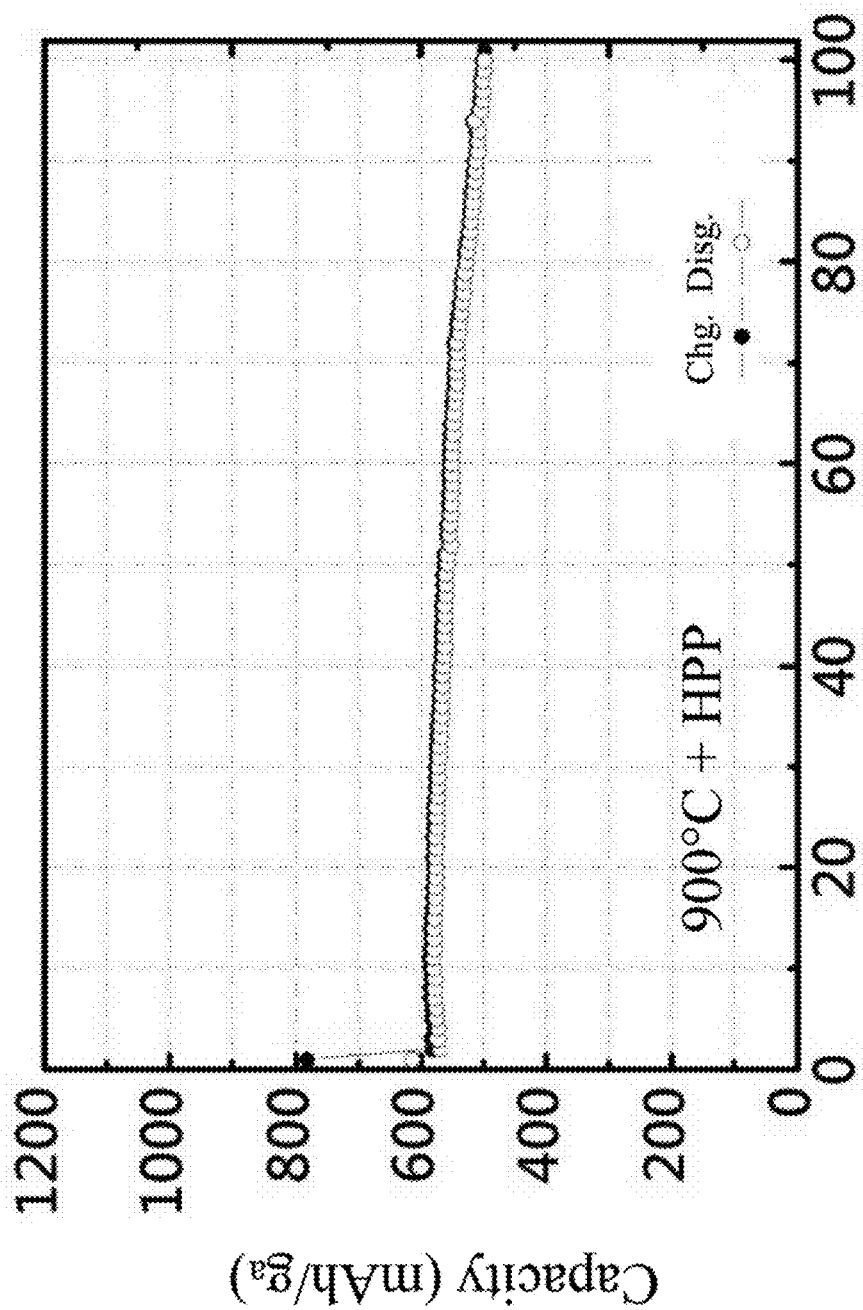

FIGS. 13A to 13B are comparison diagrams showing the charge-discharge efficiency of lithium batteries with and without mixing the silicon composite materials and the graphene units by passing through the high pressure channel 300. It is shown that after mixing through the high pressure channel 300, the charge-discharge capacity retention is increased due to the formation of the multi-layer graphene. This is because the graphene has high strength to effectively suppress the volume expansion of the silicon material 211. Furthermore, high electric conductivity of graphene can prevent the increase of the resistance after several charge-discharge cycles of the lithium battery.

In sum, the present disclosure provides methods of: performing a thermal process to form a composite layer on a silicon material thereby forming a silicon composite material; passing a graphite material through a high pressure channel to form graphene units; and mixing the silicon composite materials with the graphene units to form a negative electrode material of a lithium battery. The capacity and the charge-discharge retention rate of this kind of negative electrode material can be increased by the formation of the silicon carbide and the graphene units. Moreover, a nickel silicide, a nickel oxide and a silicon projection having nickel-contained free end are formed around the silicon material and are capable of suppressing the volume expansion of the silicon material which lowers the efficiency, thereby increasing the charge-discharge retention rate and the lifetime.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing a negative electrode material of a lithium battery, the method comprising:
    covering a metal material and a carbon material on a surface of a silicon material; and
    performing a thermal process to make the metal material and the carbon material react on the surface of the silicon material thereby forming a silicon composite material and at least one projection on the surface of the silicon material, wherein a free end of the projection is enlarged to form a head, the silicon composite material is used as the negative electrode material of the lithium battery, the silicon composite material comprises a composite layer forming on the surface of the silicon material, and the composite layer comprises a metal silicide, a metal oxide, a silicon carbide and a silicon oxide.

2. The method of claim 1, wherein the thermal process is performed at a temperature range within 800° C. and 1200° C.

3. The method of claim 1, wherein the metal material catalyzes a formation of the silicon carbide and the projection while performing the thermal process.

4. The method of claim 1, further comprising:
    passing a graphite material through a high pressure channel, thereby stripping a plurality of graphene units from the graphite material by rubbing against the high pressure channel; and
    mixing the graphene units with the silicon material, the metal material and the carbon material, then performing the thermal process to form the silicon composite material.

5. The method of claim 4, further comprising:
    passing a mixture of the graphene units, the carbon material, the metal material and the silicon material through the high pressure channel for uniformly mixing the graphene units, the silicon material, the metal material and the carbon material.

6. The method of claim 4, further comprising:
    mixing the graphene units with the silicon material, the metal material and the carbon material, then performing a drying process and a spheroidizing process before the thermal process to form a plurality of ball-shaped negative electrode materials of the lithium battery.

7. The method of claim 1, further comprising:
    passing a graphite material through a high pressure channel, thereby stripping a plurality of graphene units from the graphite material by rubbing against the high pressure channel; and
    mixing the graphene units with the silicon composite material.

8. The method of claim 7, further comprising:
    passing a mixture of the qraphene units and the silicon composite material through the high pressure channel for uniformly mixing the graphene units and the silicon composite material.

9. The method of claim 7, wherein each of the graphene units comprises less than 30 graphene layers.

10. A negative electrode material of a lithium battery, comprising:
    a silicon composite material comprising a silicon material, a composite layer and at least one projection formed on a surface of the silicon material, wherein the composite layer comprises a metal silicide, a metal oxide, a silicon carbide and a silicon oxide, and a free end of the projection is enlarged to form a head; and
    a plurality of graphene units mixed with the silicon composite material to form the negative electrode material of the lithium battery.

11. The negative electrode material of the lithium battery of claim 10, wherein each of the graphene units comprises less than 30 graphene layers.

12. A negative electrode material of a lithium battery, comprising:
    a silicon material, wherein at least one projection is formed on a surface of the silicon material, and a free end of the projection is enlarged to form a head, wherein a composite layer is formed on the surface of the silicon material, the composite layer comprises a silicide of a metal and a silicon carbide, and the composite layer comprises a metal oxide.

13. The negative electrode material of the lithium battery of claim 12, wherein the head is covered with a carbon material.

14. The negative electrode material of the lithium battery of claim 13, wherein the head comprises the metal.

15. The negative electrode material of the lithium battery of claim 12, wherein the projection comprises a body connected between the surface of the silicon material and the head, and the body comprises silicon.

16. The negative electrode material of the lithium battery of claim 15, wherein the body is covered with a carbon material.

17. The negative electrode material of the lithium battery of claim 12, wherein a length of the projection is within 10 nm and 800 nm.

18. The negative electrode material of the lithium battery of claim 12, wherein the head comprises the metal.

* * * * *